US012325161B2

(12) United States Patent
Pilz et al.

(10) Patent No.: US 12,325,161 B2
(45) Date of Patent: Jun. 10, 2025

(54) METHOD FOR PRODUCING AN OPTICAL ELEMENT FROM PLASTIC

(71) Applicant: Docter Optics SE, Neustadt an der Orla (DE)

(72) Inventors: Florian Pilz, Neustadt an der Orla (DE); Sven Fröhlich, Neustadt an der Orla (DE)

(73) Assignee: Docter Optics SE, Neustadt an der Orla (DE)

( * ) Notice: Subject to any disclaimer, the term of this patent is extended or adjusted under 35 U.S.C. 154(b) by 123 days.

(21) Appl. No.: 18/251,432

(22) PCT Filed: Oct. 27, 2021

(86) PCT No.: PCT/DE2021/100858
§ 371 (c)(1),
(2) Date: May 2, 2023

(87) PCT Pub. No.: WO2022/096060
PCT Pub. Date: May 12, 2022

(65) Prior Publication Data
US 2023/0398722 A1    Dec. 14, 2023

(30) Foreign Application Priority Data

Nov. 4, 2020   (DE) .................... 10 2020 129 103.5
Dec. 19, 2020  (DE) .................... 10 2020 134 325.6
Jun. 18, 2021  (DE) .................... 10 2021 115 907.5

(51) Int. Cl.
B29C 45/16    (2006.01)
B29C 45/76    (2006.01)
B29L 11/00    (2006.01)

(52) U.S. Cl.
CPC ........ B29C 45/1618 (2013.01); B29C 45/766 (2013.01); *B29C 2945/76498* (2013.01);
(Continued)

(58) Field of Classification Search
CPC ............. B29C 45/1618; B29C 45/766; B29C 45/1615; B29C 2045/0043
See application file for complete search history.

(56) References Cited

U.S. PATENT DOCUMENTS

| 821,610 A | 5/1906 | Cox |
| 4,666,496 A | 5/1987 | Fecik |

(Continued)

FOREIGN PATENT DOCUMENTS

| CN | 205049796 | 2/2016 |
| CN | 105819674 | 8/2016 |

(Continued)

OTHER PUBLICATIONS

Audi Matrix LED—Scheinwerfer, https://web.archive.org/web20150109234745/http://audi.de/content/de/brand/de/vorsprung_durch_technik/content/2013/08/Audi-A8, Jun. 28, 2022, 3 pages.

(Continued)

*Primary Examiner* — Virak Nguon
(74) *Attorney, Agent, or Firm* — Carter, DeLuca & Farrell LLP

(57) ABSTRACT

The disclosure relates to a method for producing an optical element having at least one optically effective surface. The optically effective surface comprises a contour and a surface structure superimposed on the contour. Transparent liquid plastic is injection-molded by means of a (smooth) injection mold of an injection molding machine (500) in dependence on a group of injection molding parameters to form an injection molded component (21) having the contour of the optically effective surface but without the surface structure superimposed on the contour, wherein at least one parameter of the group of injection molding parameters is set and/or corrected in dependence on properties of the injection (Continued)

molded component (21), and wherein the optical element is produced using the group of injection molding parameters.

19 Claims, 15 Drawing Sheets

(52) U.S. Cl.
CPC ............ *B29C 2945/76531* (2013.01); *B29C 2945/76752* (2013.01); *B29C 2945/76859* (2013.01); *B29C 2945/76862* (2013.01); *B29K 2995/0026* (2013.01); *B29L 2011/0016* (2013.01)

(56) References Cited

U.S. PATENT DOCUMENTS

| | | |
|---|---|---|
| 4,756,737 A | 7/1988 | Yoshimura et al. |
| 5,120,343 A | 6/1992 | Monji et al. |
| 5,227,917 A | 7/1993 | Kubo et al. |
| 6,114,039 A | 9/2000 | Rifqi |
| 6,130,777 A | 10/2000 | Yamashita et al. |
| 6,638,450 B2 | 10/2003 | Richard |
| 7,798,688 B2 | 9/2010 | Hamkens |
| 8,998,435 B2 | 4/2015 | Brick |
| 2001/0033726 A1 | 10/2001 | Shie et al. |
| 2002/0153624 A1 | 10/2002 | Tumlin et al. |
| 2003/0001301 A1 | 1/2003 | Duroux et al. |
| 2004/0244421 A1 | 12/2004 | Kato et al. |
| 2005/0054514 A1 | 3/2005 | Ishioka et al. |
| 2006/0072208 A1 | 4/2006 | Bonitz et al. |
| 2008/0315162 A1 | 12/2008 | Berzon |
| 2009/0000336 A1 | 1/2009 | Rosler |
| 2009/0029117 A1 | 1/2009 | Aoi et al. |
| 2009/0323502 A1 | 12/2009 | Murata et al. |
| 2010/0246008 A1 | 9/2010 | Murata et al. |
| 2011/0266576 A1 | 11/2011 | Engl et al. |
| 2012/0040044 A1 | 2/2012 | Uehira et al. |
| 2013/0221551 A1 | 8/2013 | Genda |
| 2013/0239619 A1 | 9/2013 | Wintzer et al. |
| 2013/0242590 A1 | 9/2013 | Fedosik et al. |
| 2013/0250595 A1 | 9/2013 | Fedosik et al. |
| 2013/0250596 A1 | 9/2013 | Fedosik et al. |
| 2013/0250597 A1 | 9/2013 | Fedosik et al. |
| 2013/0258694 A1 | 10/2013 | Fedosik et al. |
| 2014/0033767 A1 | 2/2014 | Wintzer et al. |
| 2014/0042650 A1 | 2/2014 | Muhle et al. |
| 2014/0286032 A1 | 9/2014 | Fedosik et al. |
| 2014/0332991 A1 | 11/2014 | Giessauf et al. |
| 2014/0347876 A1 | 11/2014 | Fedosik et al. |
| 2015/0036976 A1 | 2/2015 | Wintzer et al. |
| 2015/0109810 A1 | 4/2015 | Wintzer et al. |
| 2015/0124472 A1 | 5/2015 | Wintzer et al. |
| 2015/0224723 A1 | 8/2015 | Hamkens |
| 2015/0292701 A1 | 10/2015 | Wintzer et al. |
| 2015/0300587 A1 | 10/2015 | Scheibner et al. |
| 2015/0330590 A1 | 11/2015 | Wintzer et al. |
| 2015/0369436 A1 | 12/2015 | Wintzer et al. |
| 2016/0082679 A1 | 3/2016 | Kikuchi |
| 2016/0151985 A1* | 6/2016 | Iatan .................. F21V 7/0091 264/1.7 |
| 2017/0327402 A1 | 11/2017 | Fujii |
| 2018/0251395 A1 | 9/2018 | Akiba et al. |
| 2018/0283639 A1 | 10/2018 | Tessmer et al. |
| 2018/0328558 A1 | 11/2018 | Okubo |
| 2019/0041556 A1 | 2/2019 | Iwata |
| 2019/0331310 A1 | 10/2019 | Wintzer et al. |
| 2020/0195823 A1 | 6/2020 | Furutake |
| 2021/0130738 A1 | 5/2021 | Rougemont |
| 2022/0177345 A1 | 6/2022 | Dittmann et al. |
| 2022/0289612 A1 | 9/2022 | Diatta et al. |
| 2022/0298050 A1 | 9/2022 | Kuppe et al. |
| 2022/0373151 A1 | 11/2022 | Zhang et al. |

FOREIGN PATENT DOCUMENTS

| | | |
|---|---|---|
| DE | 1 099 964 | 2/1961 |
| DE | 2906858 | 9/1980 |
| DE | 36 02 262 | 5/1987 |
| DE | 299 14 114 | 11/1999 |
| DE | 69701714 | 2/2001 |
| DE | 102 26 471 | 1/2004 |
| DE | 10 2005 009 556 | 9/2005 |
| DE | 10116139 B4 | 4/2006 |
| DE | 102006034431 A1 | 1/2008 |
| DE | 102008054029 | 5/2010 |
| DE | 10100515 B4 | 12/2010 |
| DE | 102011114636 A1 | 4/2013 |
| DE | 102012205196 | 10/2013 |
| DE | 20 2014 100462 | 3/2014 |
| DE | 10 2015 001609 | 8/2016 |
| DE | 10 2015 007 832 | 12/2016 |
| DE | 102016102408 A1 | 6/2017 |
| DE | 10 2017 105 888 | 9/2018 |
| DE | 10 2015 012 324 | 6/2019 |
| DE | 10 2008 034 153 | 8/2019 |
| DE | 10 2020 115078 | 1/2021 |
| DE | 102021130715 A1 | 6/2022 |
| DE | 102021105560 A1 | 9/2022 |
| EP | 1954642 B1 | 4/2009 |
| EP | 2402140 | 1/2012 |
| EP | 2666620 | 11/2013 |
| EP | 3312501 | 4/2018 |
| EP | 3520983 | 8/2019 |
| EP | 3575362 | 12/2019 |
| JP | 01072822 | 3/1989 |
| JP | H06166526 | 6/1994 |
| JP | H06-286754 | 10/1994 |
| JP | H07330347 A | 12/1995 |
| JP | 2002160256 | 6/2002 |
| JP | 2003048728 A | 2/2003 |
| JP | 2003246630 | 9/2003 |
| JP | 2004009379 | 1/2004 |
| JP | 2006062359 | 3/2006 |
| JP | 4400798 | 1/2010 |
| JP | 2010046895 | 3/2010 |
| JP | 2018118900 | 8/2019 |
| JP | 2019135202 | 8/2019 |
| KR | 20160028901 | 3/2016 |
| KR | 101971276 | 4/2019 |
| WO | 2004096724 | 11/2004 |
| WO | 2009/036739 | 3/2009 |
| WO | 2009/109209 | 9/2009 |
| WO | 2012072187 A2 | 6/2012 |
| WO | 2012072188 A1 | 6/2012 |
| WO | 2012072189 A2 | 6/2012 |
| WO | 2012072190 A2 | 6/2012 |
| WO | 2012072191 A2 | 6/2012 |
| WO | 2012072192 | 6/2012 |
| WO | 2012072192 A1 | 6/2012 |
| WO | 2012072193 A2 | 6/2012 |
| WO | 2012130352 A1 | 10/2012 |
| WO | 2013068053 A1 | 5/2013 |
| WO | 2013068063 A1 | 5/2013 |
| WO | 2013123954 A1 | 8/2013 |
| WO | 2013135259 A1 | 9/2013 |
| WO | 2013159847 A1 | 10/2013 |
| WO | 2013170923 A1 | 11/2013 |
| WO | 2013178311 A1 | 12/2013 |
| WO | 2014072003 A1 | 5/2014 |
| WO | 2014114307 A1 | 7/2014 |
| WO | 2014114308 A1 | 7/2014 |
| WO | 2014114309 A1 | 7/2014 |
| WO | 2014131426 A1 | 9/2014 |
| WO | 2014/161014 | 10/2014 |
| WO | 2017059945 A1 | 4/2017 |
| WO | 2017/207079 | 12/2017 |
| WO | 2017215775 A1 | 12/2017 |
| WO | 2019/072326 | 4/2019 |
| WO | 2019/179571 | 9/2019 |
| WO | WO-2019179571 A1 * | 9/2019 .......... B29C 45/1618 |

(56) References Cited

FOREIGN PATENT DOCUMENTS

| WO | 2019243343 A1 | 12/2019 |
|---|---|---|
| WO | 2021/008657 | 1/2021 |
| WO | 2021008647 | 1/2021 |

OTHER PUBLICATIONS

Veb Jena Glaswerk Schott & Gen, "Structure and Nature of Glass", 1st Edition, Sep. 1, 1974, 3 pages.
Vollmer, Alfred, "Matrix-LED-und Laserlicht bietet viele Vorteile", all-electronics, https://www.all-electronics.de/automotive-transportation/matrix-led-under-laserlicht-bietet-viele-vorteile.html, Apr. 15, 2014, 12 pages.
Schafer, Patrick "Hella bringt neues SSL-HD-Matrix Lichtsystem auf den Markt", Sep. 18, 2019, Springer Professional, 3 pages.
Authors' Collective, "Glass Technology", Glastechnik, Leipzig 1972, 12 pages.
International Search Report and Written Opinion Issued Feb. 1, 2022 for Corresponding PCT Application No. PCT/DE2021/100858.
Audi—Vorsprung durch Technik, http://web.archive.org/web/20150109234745/http://www.audi.de/content/de/brand/de/vorsprung_durch_technik/content/2013/08/Audi-A8-erstrahlt-in-ne, May 22, 2023.
Vehicle Bodies, Bosch Automotive Handbook, 9th Edition, 2014, p. 1040.
Digital Light: Millions of Pixels on the Road, https://www.al-lighting.com/news/article/digital-light-millions-of-pixels- Oct. 31, 2018.
Hella bringt neues SSL-HD-Matrix-Lichtsystem auf den Markt, https://www.springerprofessional.de/fahrzeug-lichttechnik/fahrzeugsicherheit/hella-bringt-neues-ssl-hd-matrix-lichtsystem-auf-den-markt/17182758, Sep. 18, 2019.
Von Alfred Vollmer,"Matrix-LED-und Laserlicht bietet viele Vorteile", https://www.all-electronics.de/automotive-transportation/matrix-led-und-laserlicht-bietet-viele-vorteile.html, Apr. 15, 2014.
SSL|HD: hochintegriertes HD-LED-Lichtsystem von Hella, https://www.highlight-web.de/5874/hella-ssl-hd/, Sep. 13, 2019.
Hopmann, Christian et al., "Technologie des Spritzgießens" Lern-und Arbeitsbuch, 2017, pp. 19, 29, 57-59, 64-70.
Unser Digital Light SSL | HD-Lichtsystem: ein neuer Meilenstein der automobilen Lichttechnik | HELLA, https://www.hella.com/techworld/de/Lounge/Unser-Digital-Light-SSL-HD-Lichtsystem-ein-neuer-Meilenstein-der-automobilen-Lichttechnik-55548/, 11 pages.
International Search Report Issued Jan. 26, 2021 for Corresponding PCT Application No. PCT/DE2020/100860.
International Search Report and Written Opinion Issued May 20, 2019 for Corresponding PCT Application No. PCT/DE2019/100249.
International Preliminary Report on Patentability Issued on Jan. 18, 2022 in Corresponding PCT Application No. PCT/DE2020/100478.
International Search Report and Written Opinion Issued on Sep. 16, 2020 In Corresponding PCT Application No. PCT/DE2020/100478.
Office Action Dated Mar. 20, 2020 for Corresponding Patent Application No. DE 10 2019 119 040.1.
Office Action Dated Feb. 19, 2020 for Corresponding Patent Application No. DE 10 2019 119 042.8.
International Preliminary Report on Patentability Issued on Jan. 18, 2022 in Corresponding PCT Application No. PCT/DE2020/100609.
International Search Report and Written Opinion Issued on Oct. 16, 2020 In Corresponding PCT Application No. PCT/DE2020/100609.
International Preliminary Report on Patentability Issued on Sep. 22, 2020 for Corresponding PCT Application No. PCT/DE2019/100249.
German Office Action Dated Jul. 13, 2021 for Corresponding Patent Application No. DE 10 2020 127 638.9.
International Search Report and Written Opinion Issued on Apr. 8, 2021 In Corresponding PCT Application No. PCT/DE2020/101007.
International Preliminary Report on Patentability Issued on May 17, 2022 for Corresponding PCT Application No. PCT/DE2020/101007.
Search Report Issued on Nov. 22, 2021 for Corresponding Patent Application No. DE 10 2021 105 560.1.
International Preliminary Report on Patentability Issued on Apr. 12, 2022 for Corresponding PCT Application No. PCT/DE2020/100860.
International Search Report and Written Opinion Issued May 6, 2021 for PCT/DE2021/100035.
International Preliminary Report on Patentability Issued on Jul. 19, 2022 for Corresponding PCT Application No. PCT/DE2021/100035.
International Preliminary Report on Patentability Issued in Corresponding PCT Application No. PCT/DE2021/100136 Dated Aug. 23, 2022.
International Search Report and Written Opinion Issued May 25, 2021 for PCT/DE/2021/100136.
International Search Report and Written Opinion Issued Feb. 4, 2022 for Corresponding PCT Application No. PCT/DE2021/100840.
International Preliminary Report on Patentability Issued May 8, 2023 for PCT/DE2021/100858.

* cited by examiner

US 12,325,161 B2

METHOD FOR PRODUCING AN OPTICAL ELEMENT FROM PLASTIC

FIELD OF THE DISCLOSURE

The disclosure relates to a method for producing an optical element having at least one optically effective surface, wherein the optically effective surface comprises a contour and a surface structure superimposed on the contour,

BACKGROUND

Such a so-called multi-cavity process is disclosed, for example, in WO 2014/161014 A1, DE 10 2015 012 324 B4 and WO 2019/179571 A1. For example, WO 2014/161014 A1 discloses a method for producing an injection-molded part, for example an optical element, wherein an injection molding compound is molded at at least two injection stations by means of at least two injection operations, wherein a pre-injection molded part produced in one of the at least two injection operations is cooled in a cooling station between the at least two injection operations. The aim of the multi-cavity process is to select the layer thicknesses in such a way that the cycle time is optimally short (see for example DE 10 2008 034 153 B4).

SUMMARY

The present disclosure relates for example to a method for producing an optical element having at least one optically effective surface, wherein the optically effective surface comprises a contour and a surface structure superimposed on the contour, wherein for example it is provided that liquid transparent plastic is injection molded by means of a (smooth) injection mold of an injection molding machine in dependence on a group of injection molding parameters to form an injection molded component having the contour of the optically effective surface without a surface structure superimposed on the contour, wherein thereafter at least one parameter from the group of injection molding parameters is set and/or corrected in dependence on properties of the injection molded component.

DESCRIPTION OF THE SPECIFIC EMBODIMENTS

Figure 1:
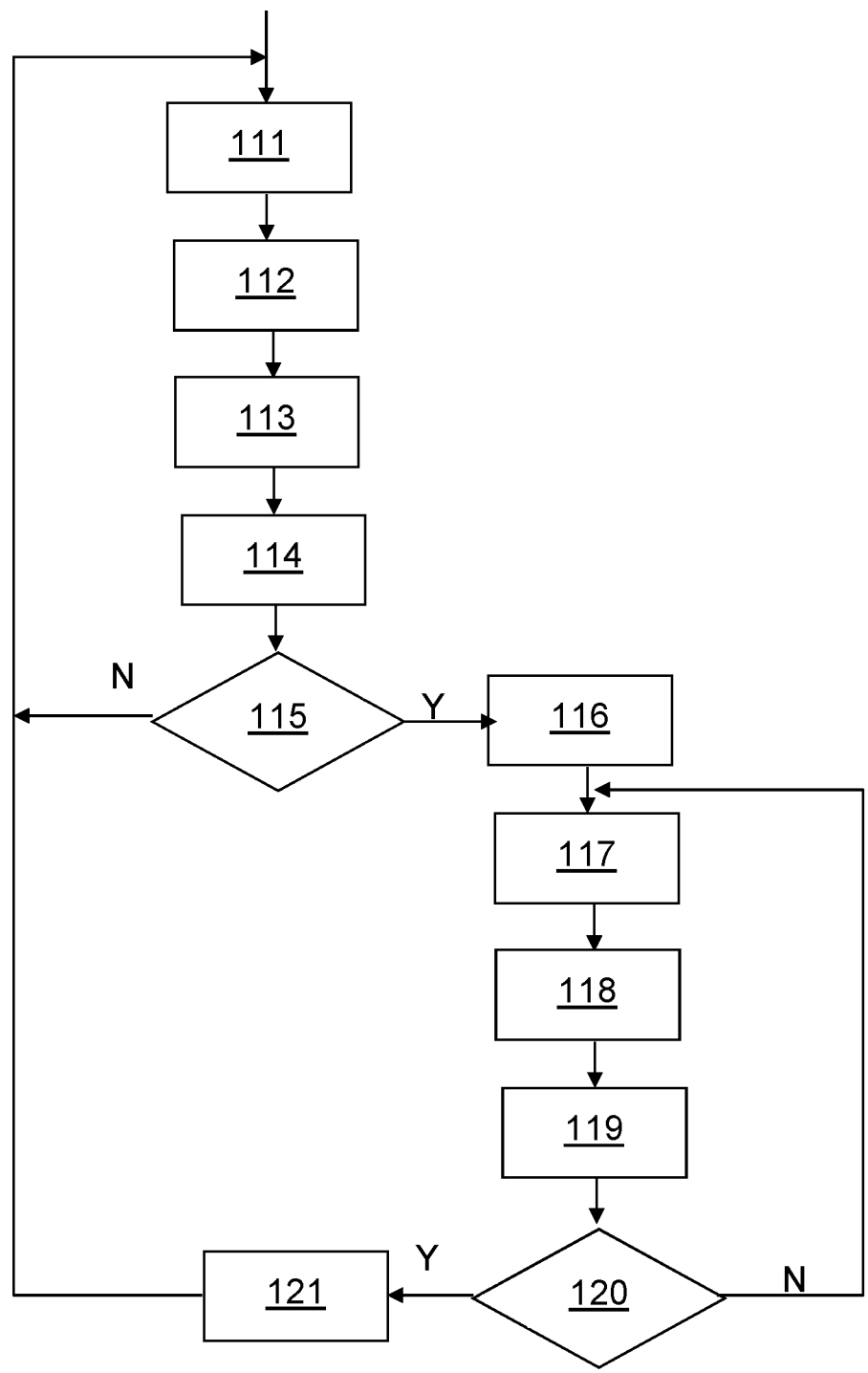
FIG. 1 shows an embodiment of a method for producing an optical element.

The present disclosure relates to a method for producing an optical element having at least one optically effective surface according to claim 1 and according to claim 9, wherein the optically effective surface comprises a contour and a surface structure superimposed on the contour, wherein for example it is provided that liquid transparent plastic is injection molded by means of a (smooth) injection mold of an injection molding machine in dependence on a group of injection molding parameters to form an injection molded component having the contour of the optically effective surface without a surface structure superimposed on the contour, wherein thereafter at least one parameter from the group of injection molding parameters is set and/or corrected in dependence on properties of the injection molded component, and wherein thereafter the optical element with liquid transparent plastic is injection molded using the group of (set and/or corrected) injection molding parameters. For example, it is provided that during injection molding a further injection mold corresponding to the (smooth) injection mold is used, by means of which the surface structure or the contour is molded or formed in connection with the surface structure.

The disclosure further relates to a method of producing an optical element having at least one optically effective surface, wherein the optically effective surface comprises a contour and may comprise or comprises a surface structure superimposed on the contour, wherein, in a first injection molding step, liquid transparent plastic is injection molded by means of a first injection mold of an injection molding machine to form a pre-injection molded component and/or a pre-injection molded part having at least one preinjection molded component as a function of a first group of injection molding parameters, wherein the pre-injection molded component and/or the pre-injection molded part with the at least one pre-injection molded component is cooled after the first injection molding step in a cooling step, for example outside the first injection mold and/or outside the injection molding machine, wherein, after the cooling step, in a second injection molding step, by means of a second injection mold of a (further) or the injection molding machine, a layer of plastic forming the optically effective surface is injection molded directly or indirectly onto the pre-injection molded component in dependence on a second group of injection molding parameters, wherein a smooth injection mold corresponding to the second injection mold is kept and/or provided, wherein the second injection mold is replaced by the smooth injection mold corresponding to the second injection mold, wherein at least one optical test element is injection molded by means of the smooth injection mold corresponding to the second injection mold, wherein at least one parameter from the first group of injection molding parameters and/or at least one parameter from the second group of injection molding parameters is set and/or corrected in dependence of properties of the test element, wherein the smooth injection mold corresponding to the second injection mold is replaced by the second injection mold, and wherein the optical element is injection molded in the first injection molding step using the first injection mold in combination with the second injection molding step using the second injection mold (and optionally a further or third injection molding step), wherein at least one (set and/or) corrected parameter from the first group of injection molding parameters is used for the first injection molding step and/or at least one (set and/or) corrected parameter from the second group of injection molding parameters is used for the second injection molding step.

For example, it is provided that in the method of producing an optical element having at least one optically effective surface which comprises a contour and may comprise a surface structure superimposed on the contour, it is provided that in a first injection molding step, liquid transparent plastic is injection molded by means of a first injection mold of an injection molding machine to form a pre-injection molded component and/or a pre-injection molded part having at least one pre-injection molded component in dependence of a first group of injection molding parameters, the pre-injection molded component and/or the pre-injection molded part with at least one pre-injection molded component is cooled after the first injection molding step in a cooling step, for example outside the first injection mold and/or outside the injection molding machine, after the cooling step, in a second injection molding step, by means of a second injection mold of a (further) or the injection molding machine, a layer of plastic forming the optically effective surface is injection molded directly or indirectly onto the pre-injection molded component and/or the at least one pre-injection molded component of the pre-injection molded part in dependence of a second group of injection molding parameters, a smooth injection mold corresponding to the second injection mold is kept and/or provided, the second injection mold is replaced by the smooth injection mold corresponding to the second injection mold, at least one optical test element is injection molded from the pre-injection molded component and/or the at least one pre-injection molded component of the pre-injection molded part by means of the smooth injection mold corresponding to the second injection mold, at least one parameter from the first group of injection molding parameters and/or at least one parameter from the second group of injection molding parameters is set and/or corrected as a function of properties of the test element, the smooth injection mold corresponding to the second injection mold is replaced by the second injection mold, in the first injection molding step, a pre-injection molded component and/or a pre-injection molded part with at least one pre-injection molded component is injection molded by means of the set and/or corrected parameter of the first group of injection molding parameters (if it has been set and/or corrected at all), after the cooling step, in the second injection molding step, by means of the second injection mold of one or the injection molding machine, directly or indirectly on the pre-injection molded component and/or the at least one pre-injection molded component of the pre-injection molded part, a layer of plastic forming the optically effective surface is injection molded in dependence of the set and/or corrected parameter of the second group of injection molding parameters (if it has been set and/or corrected at all), and the manufactured optical element comprises at least one optically effective surface.

If the method is intended to produce an optical element having a first optically effective surface and a second optically effective surface, it may be provided that the second injection molding step is followed by a third injection molding step, wherein, in the third injection molding step, a layer of plastic forming the second optically effective surface is injection molded directly or indirectly onto a second surface of the pre-injection molded component and/or a second surface of the at least one pre-injection molded component of the pre-injection molded part by means of a third injection mold of one or the injection molding machine in dependence on a third group of injection molding parameters, and the produced optical element comprises a first optically effective surface and a second optically effective surface.

Alternatively, however, the or an optical element produced in a first injection molding step and a second injection molding step may include a first optically effective surface and a second optically effective surface.

In an embodiment, in the third injection molding step, the injection mold may be replaced by a smooth injection mold and a test element may be produced by means of the smooth injection mold, which is a smooth injection mold corresponding to the injection mold in the third injection molding step. Based on the properties of the test element produced in the third injection molding step, at least one parameter of the third injection molding step may then be set and/or corrected, so that further pre-injection molded components and/or pre-injection molded parts with at least one pre-injection molded component are injection molded into the optical element by means of the set and/or corrected parameter in a second injection molding step and a third injection molding step.

In an embodiment, it may be provided that in the further process, depending on properties of the test element produced in the second injection molding step and/or properties of the test element produced in the third injection molding step, at least one parameter of the first injection molding step and/or at least one parameter of the second injection molding step and/or one parameter of the third injection molding step is set and/or corrected and then the optical element is produced in three injection molding steps with at least one set and/or corrected parameter.

Injection molding parameters within the meaning of this disclosure may be, for example, the following parameters:
Injection pressure, injection flow
Changeover volume/changeover point
Holding pressure/Duration
Temperatures (injection temperature, hot runner temperature, cooling temperature)

Figure 7:
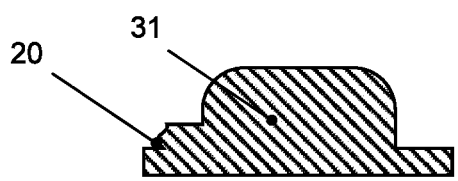
FIG. 7 shows a schematic representation of an embodiment of a pre-injection molded component after solidification of the liquid plastic according to FIG. 6.

Details on injection molding parameters can be found, for example, on pages 65, 66, 67 and 68 of the book "Technologie des Spritzgießens"—Lern-und Arbeitsbuch, Hopmann, Michaeli, Greif, Ehrig, Carl Hanser Verlag München, 2017, ISBN 978-3-448-45042-4. Example interactions between injection molding parameters are shown in FIG. 7.6 on page 67 and FIG. 7.8 on page 69 of the book "Technologie des Spritzgießens"—Lern-und Arbeitsbuch, Hopmann, Michaeli, Greif, Ehrig, Carl Hanser Verlag München, 2017, ISBN 978-3-448-45042-4.

It may also be provided that injection molding parameters within the meaning of the present disclosure are parameters without direct reference to injection molding, such as (peripheral) parameters:
Drying temperatures/durations of the plastic(s) (thermoplastics) or temperatures of the resins/components in resin/duroplast systems.
Adjustments of ionizing systems (field strengths/frequencies) to avoid static charging
Surface activation like plasma
Parameters of machine-external control devices for process control with the aid of temperatures and machine/tool pressures and expansions.

These parameters may be assigned to the first group of injection molding parameters and/or the second group of injection molding parameters. Injection molding parameters within the meaning of this disclosure may, according to one embodiment, be parameters such as geometry parameters (tool contour/geometry). In one embodiment, it may be provided that parameters within the meaning of the present disclosure may also be geometry parameters (lengths, curves, angles, and position of optical axes). It may be provided that parameters in the sense of this disclosure are parameters in the sense of a tool correction or cavity correction, in that these are determined, e.g. depending on correction factors.

Injection molding parameters within the meaning of the present disclosure can be parameters such as dwell time of the pre-injection molded components on the cooling table or injection flow. These parameters can be assigned to the first group of injection molding parameters and/or the second group of injection molding parameters.

A corrected parameter set (PAR) follows, for example, from an initial or previous parameter set, adjusted by correction parameters. To determine the parameters PAR, in one embodiment the correction values are multiplied by their respective target values. Thus, in one embodiment, the parameters PAR result as the product of the respective target value with the respective correction value. For example, if the contour accuracy is to be improved, it may be provided that the target value of a dwell time in the mold is increased by multiplication by a correction factor, or that the holding pressure duration is multiplied accordingly by a correction value>1. Further examples are shown in the following FIGS. 14A, 14B, 14C, 14D, 14E and 14F.

The determination of correction factors and/or corrected parameters or corrected injection molding parameters takes place e.g.
by employees and/or
partially/fully automated
Correction factors result, for example, from cause-and-effect relationships/knowledge/informations from one or more of the following sources:
Empirical experience knowledge
Tests in the course of development and/or measurements/testing/inspection during series production of similar and/or dissimilar components
simulations, whereby the parameters of the underlying simulation may also be calibrated or adjusted by means of the described method:
Manufacturing processes (tool filling, temperatures, flow)
Rigidity/structure of tool and/or machine
Machine inertia
Analogies derived from data collections/banks
Algorithms, neural networks, fuzzy logic and/or (other algorithms related to) artificial intelligence.

Examples of embodiments include:
Center thickness of lens too low. Increase center thickness by:
Increase holding pressure and/or
Reduction clamping force machine
Unacceptable cosmetic defects, such as smut, streaks, air inclusions. Improvement of component quality due to
Reduction/increase in injection speed and/or
Mold/mass temperatures It may be provided that injection molding parameters within the meaning of the present disclosure may be tool active elements, such as cylinder strokes, cylinder forces (for embossing functions), electrical voltage for piezo actuators, valve movement for controlling air and mass flows. These parameters can be assigned to the first group of injection molding parameters and/or the second group of injection molding parameters.

A surface structure in the sense of the present disclosure is for example a light-scattering surface structure. A light-scattering surface structure in the sense of this disclosure comprises, for example, a modulation and/or a (surface) roughness of at least 0.05 µm, for example at least 0.08 µm, or is designed as a modulation optionally with a (surface-) roughness of at least 0.05 µm, for example at least 0.08 µm. Roughness in the sense of the present disclosure is to be defined for example as Ra, for example according to ISO 4287. In a further embodiment, the light-scattering surface structure may comprise a structure mimicking a golf ball surface or be configured as a structure mimicking a golf ball surface. Suitable light-scattering surface structures are disclosed, for example, in DE 10 2005 009 556 A1, DE 102 26 471 B4 and DE 299 14 114 U1. Further usable embodiments of light-scattering surface structures are disclosed in German patent specification 1 099 964 A, DE 36 02 262 C2, DE 40 31 352 A1, U.S. Pat. No. 6,130,777 and US 2001/0033726 A1.

A light-scattering surface structure or a surface structure within the meaning of this disclosure is not a diffractive or light-diffracting surface structure. For example, it is provided that the replacement of an injection mold with a surface forming a surface structure by a corresponding injection mold forming a smooth surface does not take place if the surface structure is a diffractive or light-diffracting surface structure.

An optically effective surface is, for example, an (optically effective) light exit surface and/or an (optically effective) light entrance surface, A corresponding smooth mold or injection mold within the meaning of this disclosure is, for example, a corresponding injection mold that molds a surface that forms the contour without the surface structure. A corresponding smooth injection mold within the meaning of this disclosure for example forms a surface with a roughness of not more than 20 nm, for example not more than 10 nm, for example not more than 7 nm, for example not more than 5 nm (for example in connection with a tool, i.e. an injection mold, made of steel). A corresponding smooth injection mold (tool) within the meaning of the present disclosure made of nickel-phosphorus layers for example forms surfaces with a roughness Ra of not more than 2 nm, for example of not more than 1 nm. For example, it may be provided that the roughness of the tool or of the smooth corresponding injection mold comprises a roughness of not less than 0.5 nm. In this context, roughness within the meaning of this disclosure is defined for example as Ra, for example according to DIN ISO 4287.

In one embodiment, it is provided that the optical element comprises at least one further optically effective surface, wherein, in a third injection molding step, a layer of plastic forming the further optically effective surface is injection molded directly or indirectly onto the pre-injection molded component and/or the at least one pre-injection molded component of the preinjection molded part by means of a third injection mold in dependence of a third group of injection molding parameters.

In an alternative embodiment, it is provided that the optical element comprises at least one further optically effective surface with a contour and with a further surface structure superimposed on the contour, wherein in a third injection molding step, by means of a third injection mold, a layer of plastic forming the further optical surface with the further surface structure is injection molded directly or indirectly onto the pre-injection molded component and/or the at least one pre-injection molded component of the pre-injection molded part in dependence of a third group of injection molding parameters. For example, it is provided that the third injection mold is replaced by a smooth injection mold corresponding to the third injection mold, wherein the optical test element is injection molded both by means of the smooth injection mold corresponding to the second injection mold and by means of the smooth injection mold corresponding to the third injection mold.

In a further embodiment, at least one parameter from the first group of injection molding parameters and/or at least one parameter from the second group of injection molding parameters and/or at least one parameter from the third group of injection molding parameters is set and/or corrected as a function of properties of the test element.

In a further embodiment, it is provided that the second injection molding step is performed before the third injection molding step or, alternatively, that the third injection molding step is performed before the second injection molding step.

In another embodiment, the smooth injection mold corresponding to the third injection mold is replaced by the third injection mold, wherein the optical element is injection molded using the third injection mold.

An optical element within the meaning of this disclosure is, for example, a headlight lens. An optical element within the meaning of the present disclosure is, for example, a headlight lens for imaging a bright-dark-boundary on a roadway. An optical element within the meaning of this disclosure is, for example, a converging lens. A finished-molded lens or optical element within the meaning of this disclosure is, for example, a lens or optical element having a volume of at least 50 $cm^3$, for example of 25 $cm^3$, without a sprue.

The term "pre-injection molded component" is used in this disclosure in accordance with WO 2014/161014 A1, whereas the term "injection molded part" is used in deviation from WO 2014/161014 A1 to refer to a lens body (including rim) or multiple lens bodies (including rim) including sprue.

For example, the following terminology is used: A pre-injection molded part comprises at least one sprue and at least one pre-injection molded component. A pre-injection molded part may also comprise a sprue with two or more pre-injection molded components. An injection molded part includes at least one sprue and at least one optical element, or at least one sprue and at least one lens. An optical element or lens comprises a lens body and optionally a lens rim or edge.

The sprue in the sense of this disclosure is formed for example by the plastic (melt) solidified in the supply channels to the casting mold. It is provided that the sprue within the meaning of this disclosure is a part whose volume does not contribute to the volume of the "useful part", i.e. the volume of the optical element or lens element. Sprue within the meaning of the present disclosure includes what is referred to in English as sprue, runner and gate. A sprue within the meaning of this disclosure or this terminology is for example not limited to sprue in English.

It may be provided that the or a layer forming the optically effective surface is not thicker than 1 mm, for example not thicker than 0.75 mm, for example not thicker than 0.5 mm. A layer forming an optically effective surface or a layer forming an optically effective light entrance surface or a layer forming a light exit surface, for example, is not thicker than X millimeters within the meaning of this disclosure if at least 70%, for example at least 80%, for example at least 90%, of this layer is not thicker than X millimeters.

In a further embodiment, the method is supplemented by one or more of the following features (see WO 2019/179571 A1):

(i) It is for example provided that at least 16 optical elements, such as 16 lenses or pre-injection molded components, are injection molded in one injection molding step. For example, it is provided that at least eight units comprising a sprue and at least two optical elements or pre-injection molded components are injection molded in one step. It is for example provided that at least 32 optical elements, such as lenses or pre injection molded components, are injection molded in one injection molding step. For example, it is envisaged that at least 16 units, comprising a sprue and at least two optical elements, such as two lenses (blanks) or preinjection molded components, are injection molded in one step.

(ii) The sprue is for example connected directly to the optical element and for example not indirectly via the optically non-effective rim.

(iii) The sprue remains on the pre-injection molded component or optical element after removal. For example, the sprue is not separated until after the optical element has been injection molded or the injection molded part has been removed.

(iv) The ejection from the injection molding machine at the optical surface or at a surface of a pre-injection molded component or a pre-injection molded part takes place there or outside (point of action of the ejector), where (for the optical properties relevant) light flow is provided in the specific operation.

(v) At least two pre-injection molded components are injection molded with one sprue.

(vi) Design of the rim, where the rim is to be understood as the part of the optical element to which no optical function is assigned: The rim is not manufactured in the first injection molding step. The rim is manufactured in the second injection molding step or in the last injection molding step.

(vii) Handling and/or alignment of the pre-injection molded component in the mold or cavity for injection molding of the injection molded part is performed using the sprue.

(viii) The second sprue runs at least partly along the first sprue (ix) The volume of the sprue corresponds to at least 10%, for example at least 30%, of the volume of the pre-injection molded part or the injection-molded part.

(x) Two or more pre-injection molded components or lens elements (injection molding elements) are assigned to a sprue.

(xi) In an embodiment, the injection molding device comprises at least one hot runner. The hot runner or the predominant part of the hot runner for example has a cross-sectional area of not less than 25 $mm^2$, for example of not less than 40 $mm^2$. The cross-sectional area of a hot runner in the sense of the present disclosure is for example a cross-sectional area orthogonal to the longitudinal direction of the hot runner or orthogonal to the flow direction/average flow direction of the liquid plastic in hot runner.

(xii) A modular mold concept is provided which has a basic mold and at least one injection molding element-dependent and/or pre-injection molded element-dependent mold set (adapter mold). The sprue with its complex structures is assigned to the basic mold, whereas the optical elements (injection molded elements) and the preinjection molded components are assigned to the adapter mold (which can also be referred to as an insert mold). For example, the modular structure of the mold, cavity or tool is such that the same hot runner is provided or used for different lens shapes.

(xiii) In addition to the cooling station, a reservoir with pre-injection molded parts is provided. The handling robot can optionally remove pre-injection molded parts together with the sprue from the cooling station or from the (additional) reservoir. This means that two, for example different, types of cooling stations are provided.

(xiv) The pre-injection molded parts in the additional reservoir are kept heated or heated before being placed in the mold or cavity for injection molding of the injection molded part.

(xv) The pre-injection molded components or pre-injection molded parts are not deposited on an optical surface immediately after injection molding or after removal from the mold for injection molding of the pre-injection molded component. For example, it is intended that the pre-injection molded parts or the injection-molded parts are deposited on the sprue.

(xvi) The sprue is used for alignment, with a series of abutment surfaces or extensions or blind extensions or appendices branching off from the actual sprue. The sprue also includes centering pins. The sprue includes at least two mandrels for aligning the sprue, and thus the pre-injection molded part, in the injection mold for injection molding the injection molded part. The sprue may also be centered by a centering pin or inclined surfaces.

(xvii) The sprue for example has a cross-sectional area of not less than 25 $mm^2$, for example of not less than 40 $mm^2$. The sprue for example has over a substantial portion thereof a cross-sectional area of not less than 25 $mm^2$, for example of not less than 40 $mm^2$. The sprue for example has over a major or most portion of its length a cross-sectional area of not less than 25 $mm^2$, for example of not less than 40 $mm^2$. For the purposes of this disclosure, the cross-sectional area of a sprue is for example a cross-sectional area orthogonal to the longitudinal direction of the sprue or orthogonal to the direction of flow/middle direction of flow of the liquid plastic in the sprue.

(xviii) A pre-injection molded part or an injection molded part for example remains in the injection mold (in the tool) or in the closed injection mold (in the closed tool) for 130 to 180 seconds or no more than 180 seconds. This comprises both the time for injection molding and the time for holding pressure. In a preferred variation or embodiment, the cycle of the first injection molding machine is (approximately) twice the cycle of the second injection molding machine. For larger/thicker lenses, for example, it is intended to provide a cycle of 110 seconds on the second injection molding machine, resulting in up to about 220 seconds of dwell time of the pre-injection molded component in the first injection molding machine.

(xix) In the case of demolding problems of the optical elements, it is provided for example to implement a time-delayed stroke of individual ejectors so that moving elements are accelerated and/or delayed compared to the movement of the machine actuator. In this way, adhesive and/or clamping forces between the mold and the optical element can be overcome in a targeted manner. This improves demolding behavior, increases process stability in production and avoids/reduces unwanted impairment of the optically effective surface, such as deformation, smoothing or scratching of the surface/structure.

It is for example injection molded at a pressure of not less than 600 bar.

It is for example injection molded at a pressure of not less than 800 bar.

It is for example injection molded at a pressure not exceeding 1000 bar.

The optical element (according to the disclosure) or a corresponding lens is also used, for example, in a projection headlight. In the design as a headlight lens for a projection headlight, the optical element or a corresponding headlight lens reproduces the edge of a shield as the bright-dark-boundary on the road.

An exemplary application relates to a method for manufacturing a vehicle headlight, wherein an optical element produced according to a method having one or more of the aforementioned features is installed in a headlight housing.

Another exemplary application relates to a method for manufacturing a vehicle headlight, wherein an optical element produced according to a method having one or more of the aforementioned features is placed in a headlight housing and assembled together with at least one light source or a plurality of light sources to form a vehicle headlight.

A further exemplary application relates to a method for producing a vehicle headlight, wherein an optical element produced by a method having one or more of the aforementioned features is placed in a headlight housing as a secondary optics or as part of a secondary optics comprising a plurality of lenses for imaging a light output surface of an attachment optics and/or an illumination pattern generated by means of a primary optics and is assembled together with at least one light source or a plurality of light sources and the attachment optics to form a vehicle headlight.

Another exemplary application relates to a method of manufacturing a vehicle headlight, wherein a primary optics or an attachment optics array is produced as the primary optics for generating the illumination pattern in accordance with a method having one or more of the foregoing features.

Another exemplary application relates to a method of manufacturing a vehicle headlight, wherein the primary optics comprises a system of movable micromirrors, for example a system of more than 100,000 movable micromirrors, for example a system of more than 1,000,000 movable micromirrors, for generating the illumination pattern.

Another exemplary application relates to a method for manufacturing an objective, wherein at least a first lens is produced according to a method having one or more of the aforementioned features and is subsequently installed in an objective and/or an objective housing.

In an embodiment, it is provided that the maximum deviation of the actual value from the target value of the distance between two optically effective surfaces of the optical element is not greater than 40 µm, for example not greater than 30 µm, for example not greater than 20 µm, for example not less than 2 µm. In an embodiment, it is provided that the maximum deviation of the actual value from the target value of the distance between an optically effective surface and a plane orthogonal to the optical axis of the optically effective surface, this plane comprising the geometric center of gravity of the optical element, is not greater than 20 µm, for example not greater than 15 µm, for example not greater than 8 µm, for example not less than 1 µm. In an embodiment, it is provided that the value RMSt (total surface shape deviation) according to DIN ISO 10110-5 of April 2016 for the optically effective surfaces of the optical element, for at least one optically effective surface of the optical element and/or for at least two optically effective surfaces of the optical element, is not greater than 12 µm, for example is not greater than 10 µm, for example is not greater than 8 µm, for example is not greater than 6 µm, for example is not greater than 4 µm, for example is not greater than 2 µm, for example is not smaller than 0.5 µm.

Plastic in the sense of this disclosure may be, for example, thermoplastic resin. Thermoplastic plastic in the sense of this disclosure is for example polycarbonate, for example LED 2643, or a thermoplastic resin such as a polycarbonate resin, a polyacrylic resin or a modified polyolefin resin. Examples of thermoplastic resins or thermoplastic resin can be taken for example from DE 699 23 847 T2. For example, DE 699 23 847 T2 discloses as polycarbonate resin the suitable use of aromatic polycarbonate resin obtained by reacting a diphenol and a carbonate precursor. Examples of the diphenol in this context include bis-(hydroxyaryl)alkanes, such as 2,2-bis-(4-hydroxyphenyl)propane (so-called bisphenol A), bis-(4-hydroxyphenyl)methane, 1,1-bis-(4-hydroxyphenyl)ethane, 2,2-bis-(4-hydroxyphenyl)-butane, 2,2-bis-(4-hydroxyphenyl)-octane, 2,2-bis-(4-hydroxyphenyl)-phenylmethane, 2,2-bis-(4-hydroxy-3-methylphenyl)-propane, 1,1-bis-(4-hydroxy-3-tert.-butylphenyl)-propane, 2,2-bis-(4-hydroxy-3-bromophenyl)-propane, 2,2-bis-(4-hydroxy-3,5-dibromophenyl)-propane and 2,2-bis-(4-hydroxy-3,5-dichlorophenyl)-propane; Bis-(hydroxyphenyl)-cycloalkane, such as 1,1-bis-(hydroxyphenyl)-cyclopentane and 1,1-bis-(hydroxyphenyl)-cyclohexane; dihydroxyaryl ethers, such as 4,4'-dihydroxydiphenyl ether and 4,4'-dihydroxy-3,3'-dimethyldiphenyl ether; dihydroxydiaryl sulfides, such as 4,4'-dihydroxydiphenyl sulfide and 4,4'-dihydroxy-3,3'-dimethyldiphenyl sulfide; dihydroxydiaryl sulfoxides, such as 4,4'-dihydroxydiphenyl sulfoxide and 4,4'-dihydroxy-3,3'-dimethyldiphenyl sulfoxide; and dihydroxydiarylsulfones, such as 4,4'-dihydroxydiphenyl sulfone and 4,4'-dihydroxy-3,3'-dimethyldiphenyl sulfone. These diphenols can be used alone or in a combination of two or more products.

Plastic in the sense of this disclosure may be a thermoplastic or a duroplast. The plastic may be a polycarbonate, a PMMA, a COC (=cyclo olefines copolymer). The plastic may be a CR39. Plastic in the sense of the present disclosure is for example PMMA. In this regard, the respective plastic may have a coefficient of thermal expansion of not less than $6 \times 10^{-5}$ mm/K. In an embodiment, the plastic may have a coefficient of thermal expansion of not more than $8\times10^{-5}$ mm/K. Plastics within the meaning of the present disclosure are, for example, amorphous plastics or polymers. "The atomic structure of polymers mainly involves the non-metal elements carbon (C), hydrogen (H) and oxygen (O). Nitrogen (N), chlorine (CO, fluorine (F) and sulfur (S) also occur relatively frequently (heteroatoms)." See Bauer et al: Saechtling Plastics Pocketbook, 31 ed, (2013). Plastics within the meaning of this disclosure may also be or comprise semi-organic polymers. "So-called semi-organic polymers contain the semimetal elements silicon (Si), referred to as silicones or polysiloxanes, and boron (B)." see Bauer et al: Saechtling Kunststoff Taschenbuch, 31 Aufl, (2013). Plastics within the meaning of the present disclosure may also be or comprise siloxanes. A first plastic according to the present disclosure is different from a second plastic according to the present disclosure. A second plastic as defined in this disclosure may be and/or comprise a semi-organic polymer, a silicone, a polysiloxane, and/or a siloxane.

Motor vehicle in the sense of the disclosure is for example a land vehicle which can be used individually in road traffic. Motor vehicles within the meaning of the disclosure are for example not limited to land vehicles with internal combustion engines.

DETAILED DESCRIPTION OF THE DRAWINGS

Figure 2:
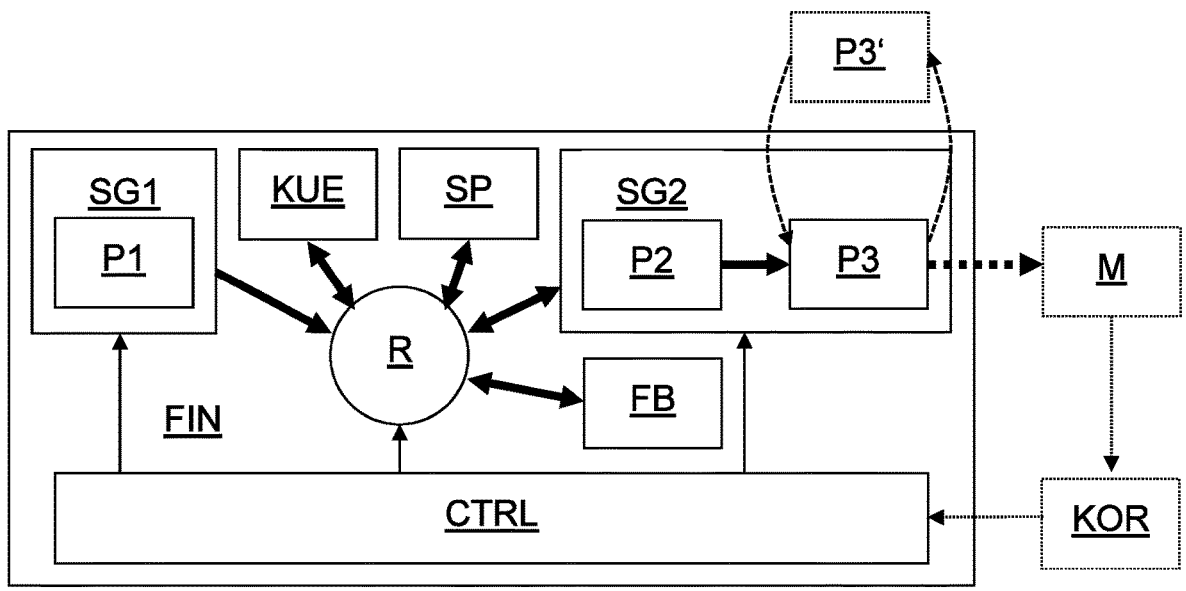
FIG. 2 shows an example of a manufacturing island for carrying out the method according to FIG. 1.

FIG. 1 shows an embodiment of a method for producing an optical element. FIG. 2 shows a schematic view of a manufacturing island FIN for implementing the method for producing an optical element according to FIG. 1. Material flows are hereby represented by thick arrows and data flows are represented by thin arrows. In FIG. 2, reference SG1 denotes an injection molding machine (injection press of the manufacturing island FIN) for producing a pre-injection molded part 2 (see FIG. 5). SP denotes a reservoir and KUE denotes a cooling system. The cooling system or cooling range KUE serves to cool the pre-injection molded part 2 and, in conjunction with a handling robot R, the transfer the pre-injection molded part 2 with a suitable temperature to an injection molding machine (injection press) SG2 for producing or injection molding the injection molded part 4 with an optical element 41 or 42 (see FIG. 11).

In addition, individual pre-injection molded parts 2 are phased into the reservoir SP of the manufacturing island FIN according to FIG. 2, so that it holds, for example, a day's production of pre-injection molded parts 2. In this way, tool changes and malfunctions due to decoupling of the processes, which are implemented on the injection molding machines (injection presses) SG1 and SG2, can be implemented while simultaneously linking them. The tool changes (see FIG. 2, FIG. 15 and FIG. 16), maintenance and/or process parameter corrections (see below) concerning the injection molding machines (injection presses) SG1 and SG2 do not have to be synchronized in this way. For example, if the injection molding machine (injection press) SG2 does not accept any pre-injection molded parts 2, these are placed in the reservoir SP. If the cooling range KUE is empty, the handling robot R removes the pre-injection molded parts 2 from the reservoir SP and feeds them to the injection molding machine (injection press) SG2.

Figure 3:
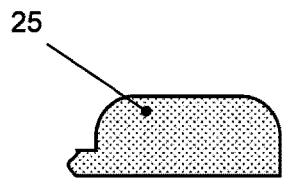
FIG. 3 shows a schematic representation of an embodiment for a cavity or injection mold filled with liquid plastic in a first injection molding step.
Figure 4:
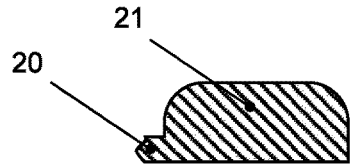
FIG. 4 shows a schematic representation of an embodiment of a pre-injection molded component after solidification of the liquid plastic according to FIG. 3.
Figure 5:
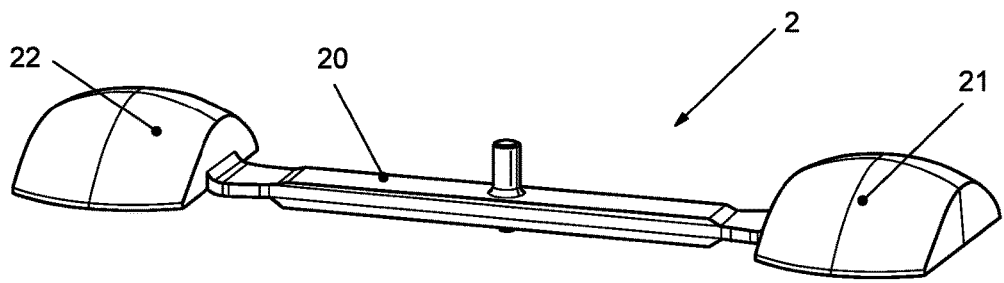
FIG. 5 shows a pre-injection molded part with a sprue and pre-injection molded component arranged thereon after a first injection molding step.

The injection molding machine SG1 comprises a mold or cavity (or tool or injection molding tool) P1 by means of which, in an injection molding step 111, the pre-injection molded part 2 shown in FIG. 5 is molded or injection molded. Here, reference signs 21 and 22 denote the pre-injection molded components of the pre-injection molded part 2, reference sign 20 denotes the sprue of the pre-injection molded part 2. To produce the pre-injection molded component 21 of the pre-injection molded part 2, liquid plastic 25 is introduced into a cavity or mold P1, not shown in greater detail, of a first injection mold, not shown in greater detail, as shown in FIG. 3. After curing or solidification or hardening or cooling below TG of the plastic 25 according to FIG. 3, a pre-injection molded component 21 with the sprue 20 is formed in the cavity or injection mold (compare FIG. 4). For example, it is provided that the term "curing" refers to resins and/or the term "solidification" refers to thermoplastics.

Afterwards the pre-injection molded part 2 with the pre-injection molded components 21 and 22 is fed to the cooling system KUE in a cooling step 112.

Figure 6:
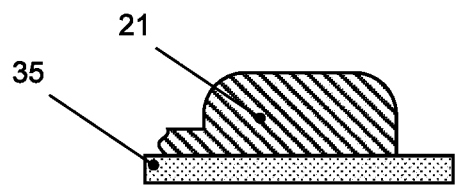
FIG. 6 shows a schematic representation of an embodiment of an injection mold or a cavity for injecting a layer in a second injection molding step.
Figure 8:
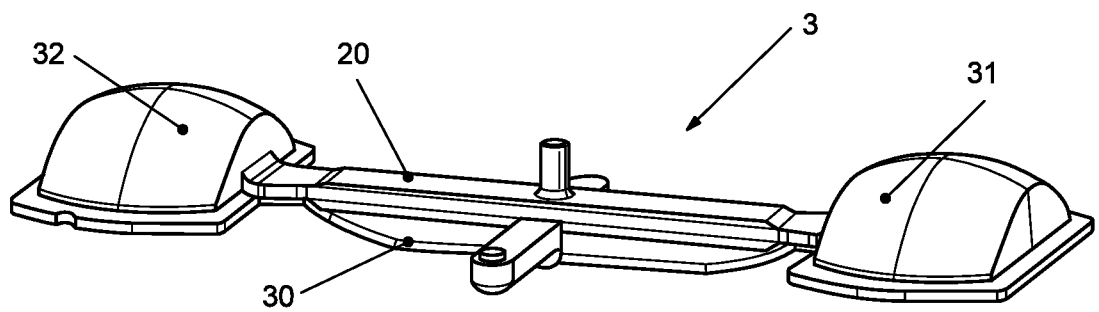
FIG. 8 shows a pre-injection molded part with a sprue and a pre-injection molded component arranged thereon after a second injection molding step.

The injection molding machine SG2 comprises a mold or cavity (or tool or injection molding tool) P2 for injecting a pre-injection molded part 3 shown in FIG. 8 by injecting a layer 35 of liquid plastic onto the pre-injection molded component 21 according to FIG. 6 in an injection molding step 112. After curing or solidification or hardening or cooling below TG of the plastic in a cooling step 112, a pre-injection molded component 31 is formed in the mold or cavity (or tool or injection molding tool) P2, which is connected to a further pre-injection molded component 32 via a sprue 30 or the sprue 20, as shown in FIG. 8. For reasons of clarity, sprue 30 is not shown in FIG. 7. The pre-injection molded components 31 and 32 form together with the sprues 20 and 30 the pre-injection molded part 3.

Figure 9:
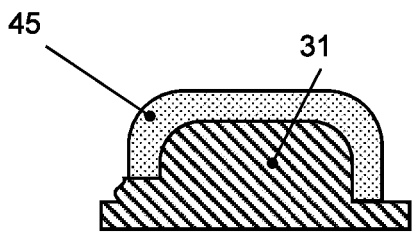
FIG. 9 shows a detailed view of an embodiment for a cavity or injection mold filled with liquid plastic in a third injection molding step.
Figure 10:
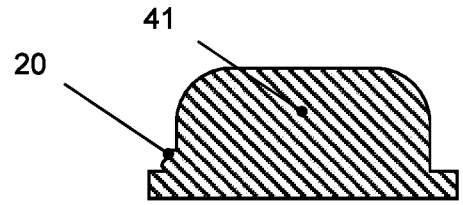
FIG. 10 shows a detailed view of an embodiment of an optical element (with sprue) after solidification of the liquid plastic according to FIG. 9.
Figure 11:
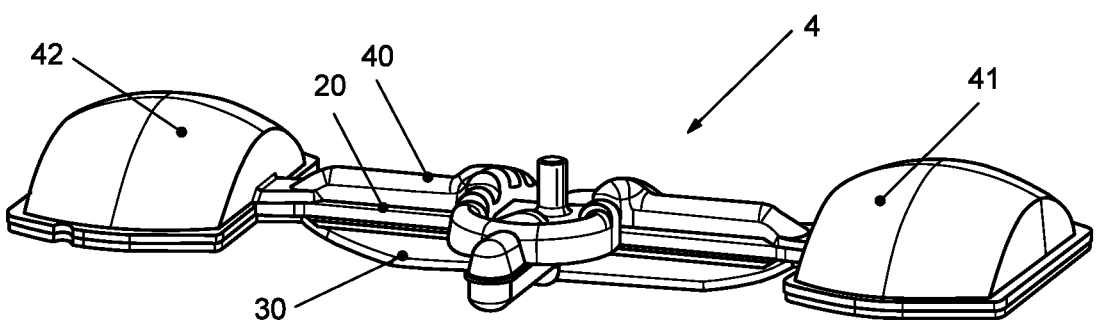
FIG. 11 shows an injection molded part with a sprue and optical elements arranged thereon after a third injection molding step.

The injection molding machine SG2 further comprises a mold or cavity (or tool or injection molding tool) P3 for injecting (in an injection molding step 114) a layer 45 of liquid plastic onto the pre-injection molded component 31 as shown in FIG. 9, and for molding an injection molded part 4 having an optical element 41 and a sprue 40 as shown in FIG. 11. In FIG. 10, reference sign 41 denotes the optical element and reference sign 20 denotes the sprue from injection molding step 111. Like sprue 30, sprue 40 of injection molded part 4 is not shown in FIG. 10 for reasons of clarity. FIG. 11 shows injection molded part 4 comprising sprues 20, 30 and 40, which connect the optical elements 41 and 42.

The manufacturing island FIN also comprises a controller CTRL for controlling the injection molding process, i.e. explicitly for controlling the injection molding machine SG1, the handling robot R, the injection molding machine SG2 and optionally the cooling range KUE. It may be provided that the controller CTRL is not a single control unit, but comprises at least 2 control units which are connected in terms of data by means of a bus system (for example in terms of a master-slave architecture). More details on suitable controllers can be found, for example, in the book "Technokogie des Spritzgießens"—Lern-und Arbeitsbuch, Hopmann, Michaeli, Greif, Ehrig, Cari Hanser Verlag Munich, 2017, ISBN 978-3-448-45042-4 on pages 19, 29, 57, 58, 59, 64, 66, 70, 74 and 76.

The injection molded part 4 according to FIG. 11, for example, is placed on a conveyor belt FB by means of the handling robot R and moved out of the area of the manufacturing island FIN by means of the conveyor belt FB. Subsequently, the optical elements 41 and 42 are separated from the sprues 20, 30 and 40 in a separation station not shown.

By means of the mold or cavity (or tool or injection molding tool) P3, a light-scattering surface structure or modulation is formed in the surface of the optical elements 41 and 42 of the injection molded part 4. For correction of the controller CTRL or its parameters PAR (cf. FIG. 14), a (and specifically a smooth) further mold or cavity (or tool or injection molding tool) P3' is provided, which can be used instead of the mold or cavity (or tool or injection molding tool) P3 (mold change step 116). This mold or cavity (or tool or injection molding tool) P3' molds the pre-injection molded part 4 without a light-scattering surface structure or modulation, i.e., with a smooth surface. This change between molds or cavities P3 to P3' occurs when a corresponding change condition, indicated in query 115 in FIG. 1, is met. The change can take place on a rotational basis and/or when the optical elements 41 or 42 have been appropriately pre-checked.

For example, it is intended that one or more injection molded optical elements (test elements) by means of the mold P3' (injection molding step 117) are checked in an optical test bench M with respect to the photometric values or their imaging quality (in a test step 118 according to FIG. 1) and the result is fed to a correction KOR for correction of the controller CTRL or its parameter settings (correction step 119 according to FIG. 1). After correction of the settings or parameters of the controller CTRL, either the mold or cavity (or tool or injection molding tool) P3' is replaced by the mold or cavity (or tool or injection molding tool) P3, or another correction run is performed. It may be provided that the correction run by means of the mold or cavity (or tool or injection molding tool) P3' is repeated until the desired result is achieved. If the parameters of the controller CTRL are set sufficiently, (cf. query 120 in FIG. 1) the mold or cavity (or tool or injection molding tool) P3' is replaced by the mold or cavity (or tool or injection molding tool) P3 (cf. mold change step 121 in FIG. 1) and pre-injection molded parts 4 or corresponding optical elements 41 and 42 with a light-scattering surface structure or modulation are molded or injection molded again.

The dashed lines in FIG. 2 indicate a tool change, i.e., with reference to FIG. 2, the change of the tool or the replacement of tool P3' by P3 or P3 by P3'.

Figure 15:
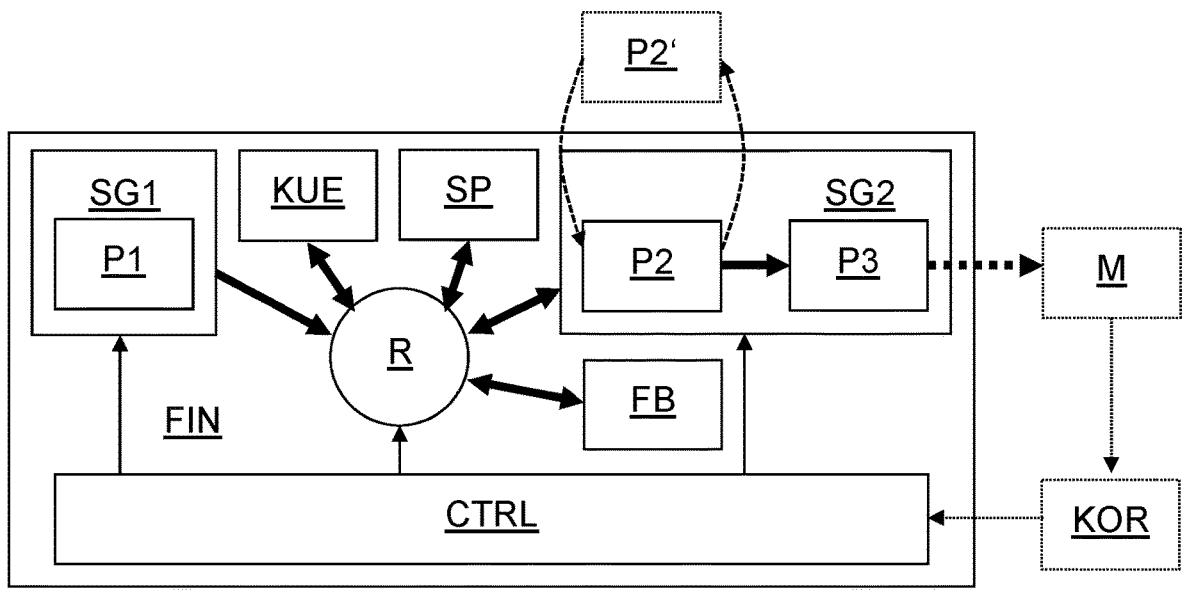
FIG. 15 shows the manufacturing island according to FIG. 2 in a modified configuration.

After the query 115, a tool change of the injection molding tool with the mold or cavity (or tool or injection molding tool) P2, P2' may also be provided according to FIG. 15. Then the producing steps 116 (injection mold change step), 117 (injection molding step), 118 (testing step) and 119 (correction step) run exactly as described for the change of the injection mold P3, P3'. The dashed lines in FIG. 15 indicate a mold change from P2 to P2', i.e. the change of the mold or the replacement of the tool P2 of the non-smooth injection mold by P2' of the smooth injection mold or P2' of the smooth injection mold by P2 of the non-smooth injection mold. Hereby, the parameters of the first injection molding step 111 and/or the parameters of the injection molding step 113 and/or the parameters of the injection molding step 114 can be set and/or corrected after this mold change.

After the query 115, a simultaneous change of the injection molding tool P2, P2' and the injection molding tool P3, P3' may also be provided, so that after the query 115, the steps 116, 117, 118 and 119 for the injection molding tool P2, P2' and the injection molding tool P3, P3' run in parallel. Thereby, during this simultaneous change of the injection molding tool P2, P2' and the injection molding tool P3, P3', the parameters of the injection molding step 111 and/or the parameters of the injection molding step 113 and/or the parameters of the injection molding step 114 can be set and/or corrected.

Figure 12:
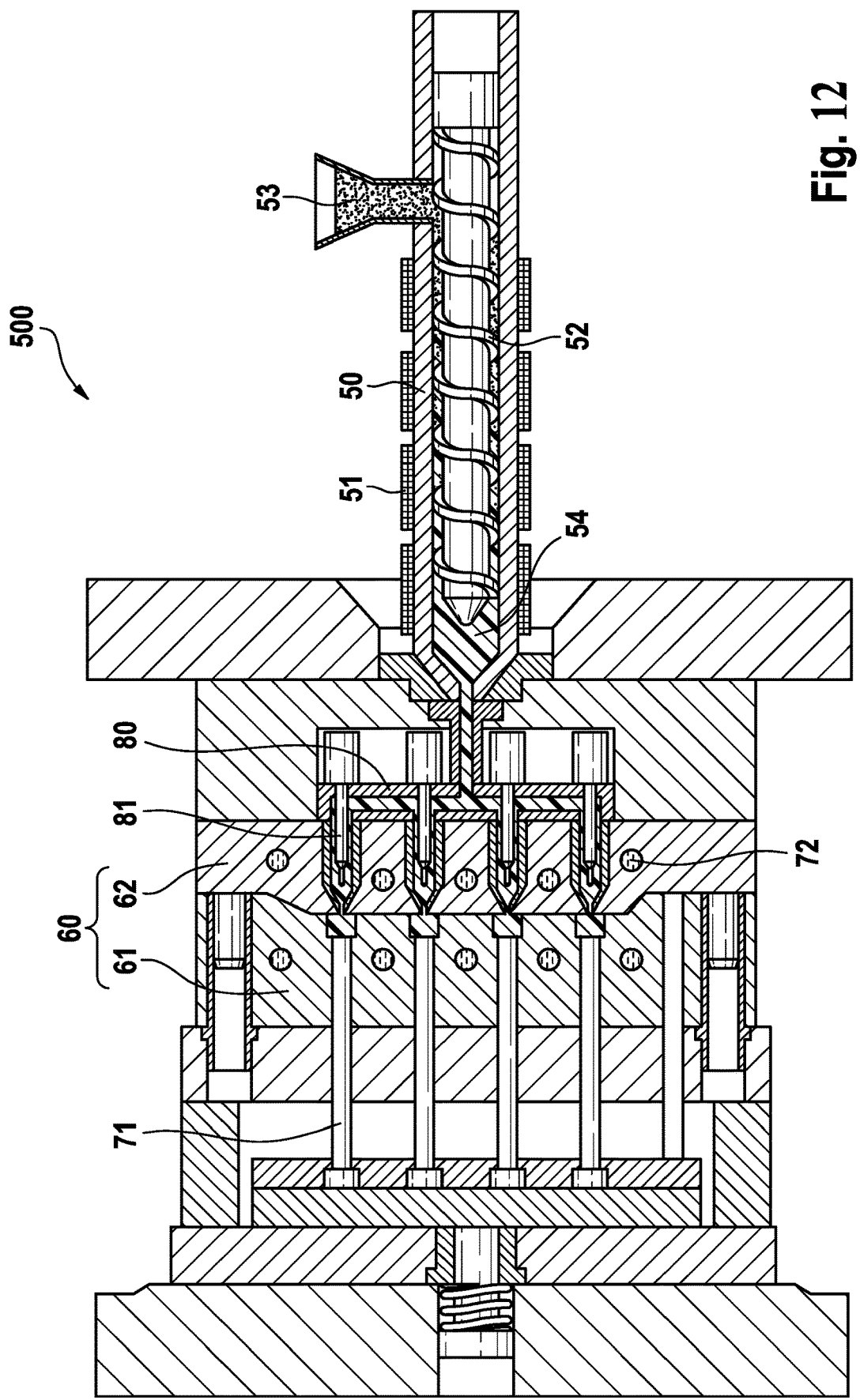
FIG. 12 shows an embodiment of an injection molding machine in a principal cross-sectional view.

FIG. 12 shows an embodiment for an injection molding machine 500 as a possible embodiment for the injection molding machine SG1 and/or for the injection molding machine SG2. The injection molding machine 500 comprises an injection molding unit 50 having a screw 52 and a heating system 51 for liquefying plastic material, which is introduced in the form of granules into a material feeder 53. The plastic liquefied by means of the heating system 51 is designated by reference sign 54. The temperature of the correspondingly liquefied plastic or the pressure may represent embodiments of injection molding parameters PAR (see FIG. 14) within the meaning of the claims.

The liquefied plastic 54 is then pressed into a hot runner system 80 and from there injected into an injection molding tool 60 via hot runner nozzles 81. The injection molding tool 60 as a possible embodiment for the tools P1, P2, P3 or P3' (as well as tool P2' (cf. FIG. 15)) comprises two partial molds 61 and 62, which can be moved apart to remove the pre-injection molded part or the injection molded part, depending on what is being produced. Reference sing 72 denotes cooling channels in the injection molding tool 60. The finished pre-injection molded parts or injection molded parts are removed using one or more ejectors 71. The duration of cooling or the temperature in the cooling channels 72 may be an embodiment of the injection molding parameters PAR as defined in the claims, (see FIG. 14) as may the duration or time of remaining in the injection molding tool 60 (see FIG. 14).

In the present embodiment, pre-injection molded parts are injection molded (pressed), namely 8 in one injection molding step. Reference sign 71 in FIG. 12 denotes one or more ejectors provided to press on the pre-injection molded components to eject them from the respective partial mold 61. The ejector or ejectors 71 are raised out of the cross-sectional area of the illustration in FIG. 12, so that they do not engage the sprue, as might appear from a purely graphic viewpoint, but rather engage with the pre-injection molded components. A similar procedure is also used in the production of the injection molded parts. For example, it is provided that when changing from a first injection molded part to a differently shaped second injection molded part or when changing from a first pre-injection molded part to a differently shaped second pre-injection molded part, a new injection mold or a new tool is provided for injection molding a different pre-injection molded part or injection molded part in the same hot runner system.

Figure 13:
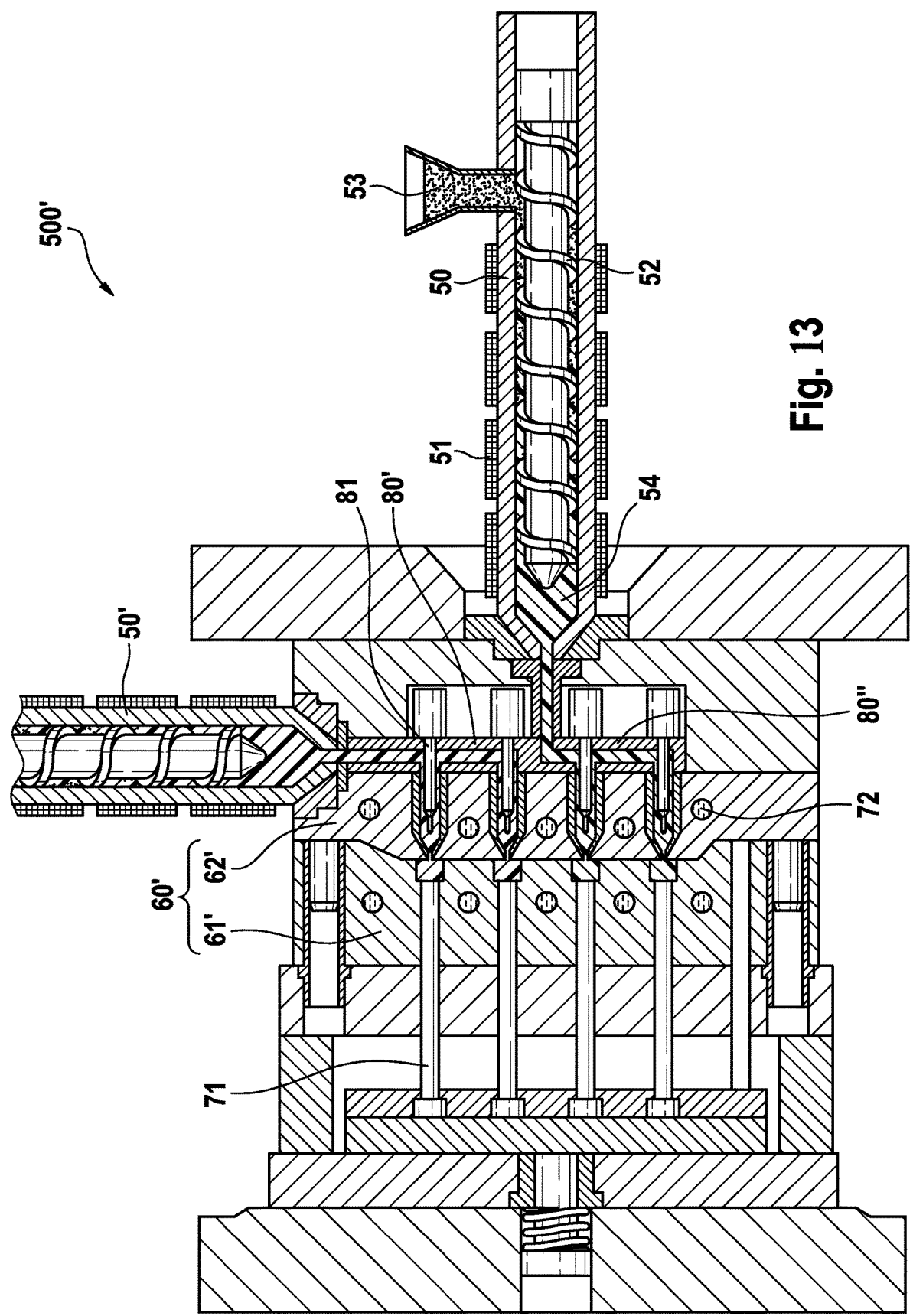
FIG. 13 shows another embodiment of an injection molding machine in a principle cross-sectional view.

For example, an injection molding machine 500' shown in FIG. 13 may also be used to produce injection molded parts, which is modified compared to injection molding machine 500. Identical reference signs in FIG. 13 as in FIG. 12 denote similar or identical elements. In contrast to the injection molding machine 500, the injection molding machine 500' has two hot runner systems 80' and 80". Here, the hot runner system 80" is supplied with liquid plastic by the injection molding unit 50, and the hot runner system 80' is supplied by an injection molding unit 50'. The injection molding tool 60' includes two partial molds 61' and 62' that can be moved apart to remove the pre-injection molded part or the injection molded part, depending on what is being produced.

Figure 14:
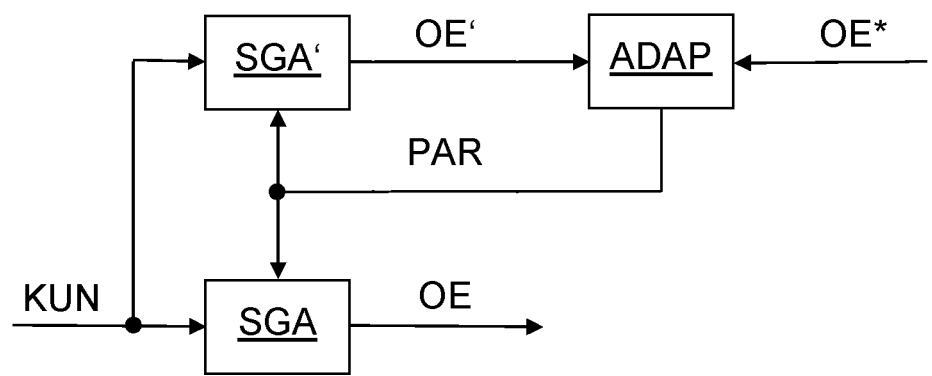
FIG. 14 shows an example of a controller for a manufacturing island in the form of a block diagram.

FIG. 14 shows a block diagram for describing the control loop resulting from the mold change with respect to molds P3 and P3' or with respect to molds P2 and P2'. Here, SGA denotes the producing sequence of an optical element OE using the cavity or tools P1 in the first injection molding step, the cooling system KUE, as well as the tools P2 in the second injection molding step and P3 in the third injection molding step. Reference character SGA' accordingly denotes the manufacturing sequence of an optical element OE using the cavity or tools P1, the cooling KUE, and the tools P2 and P3'. The input variable into the manufacturing sequences SGA and SGA' for producing an optical element OE or for producing an optical element OE' is plastic or liquid plastic KUN. The optical element OE' or its properties are fed to an adapter module ADAP (comprising optical test bench M and correction KOR according to FIG. 2). This compares the properties of the optical element OE' with the corresponding target properties or properties of a target optical element OE*. From the properties of the optical element OE' or depending on the deviation from the corresponding target values, i.e. the properties of the optical element OE*, the adapter module ADAP determines the parameters PAR, i.e. the injection molding parameters for injection molding or for controlling the injection molding machines SG1 and SG2 as well as the handling robot R and, if necessary, the cooling system KUE.

To determine the PAR parameters, the correction values are multiplied by their respective target values. The parameters PAR are thus the product of the respective target value and the respective correction value. For example, if the contour accuracy is to be improved, it may be provided that the target value of a dwell time in the mold is increased by multiplication by a correction value>1, or that the hold pressure duration is multiplied accordingly by multiplication by a correction value>1. Further examples are shown in the following FIGS. 14A, 14B, 14C, 14D, 14E and 14F.

Figure 14A:
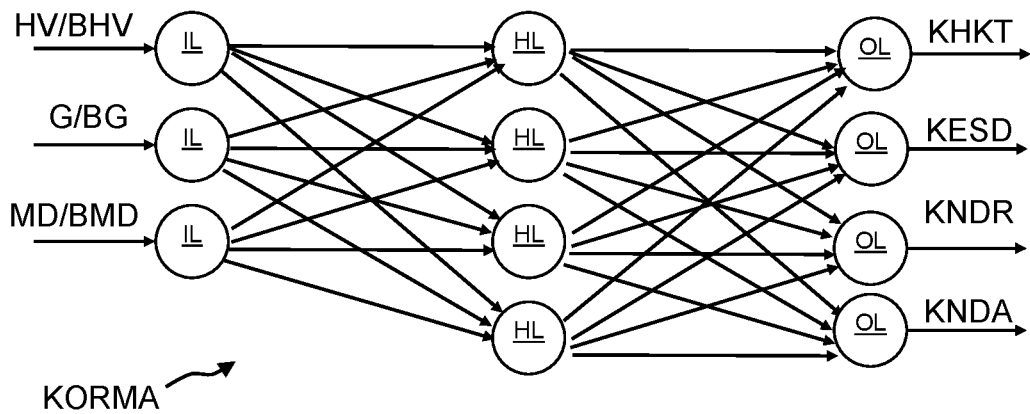
FIG. 14A shows an embodiment of a correction module.

FIG. 14A shows a correction module KORMA for determining a correction value KHKT for the hot runner temperature HKT, a correction value KESD for the injection pressure ESD, a correction value KNDR for the holding pressure NDR and a correction value KNDA for the holding pressure duration NDA as a function of the center thickness MD of an optical component, the aperture value HV of the optical component and the gradient G of the optical component.

The correction module KORMA according to FIG. 14A is implemented by means of a neural network comprising three input nodes IL (input layer), four hidden nodes HL (hidden layer) and four output nodes OL (output layer). Input variables to the input nodes IL are the quotient of the glare value HV and a base value BHV for the glare value HV, the quotient of the gradient G of a bright-dark-boundary generated by means of the optical component and its base value BG, and the quotient of the center thickness MD and a base value BMD of the center thickness MD. The base value in the sense of this disclosure can be an average value or a selected reference value, but for example a target value.

As described above, the correction values are multiplied by their respective target values to determine the parameters PAR. Thus, a corrected target value for the hot runner temperature HKT results from the product of the correction value KHKT, which is determined by the neural network as output variable, for the hot runner temperature HKT and the corresponding target value. A corrected target value for the injection pressure ESD results from the product of the correction value KESD for the injection pressure ESD determined by the neural network as output variable and the corresponding target value for the injection pressure ESD. A corrected target value for the holding pressure NDR is obtained from the product of the correction value KNDR of the holding pressure NDR determined by the neural network as output variable and the corresponding target value of the holding pressure NDR. A corrected target value for the holding pressure duration KNDA results from the product of the correction value KNDA for the holding pressure duration NDA determined by the neural network as output variable and the target value of the holding pressure duration NDA.

Figure 14B:
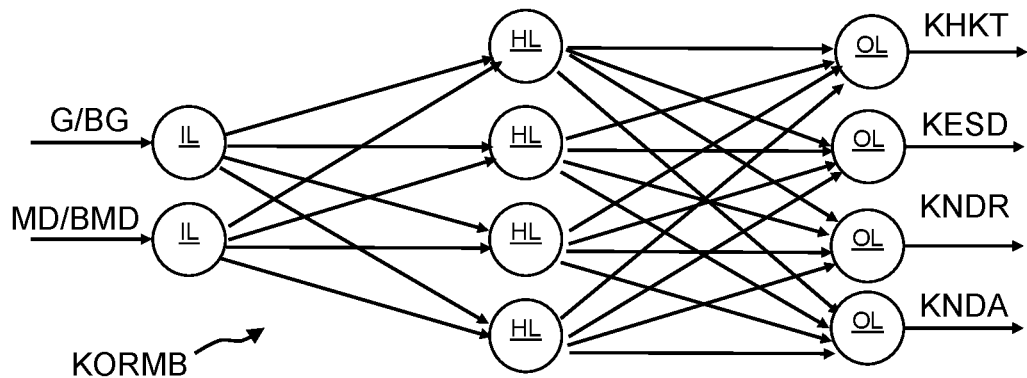
FIG. 14B shows an embodiment of another correction module.

FIG. 14B shows a correction module KORMB for determining a correction value KHKT for the hot runner temperature HKT, a correction value KESD for the injection pressure ESD, a correction value KNDR for the holding pressure NDR and a correction value KNDA for the holding pressure duration NDA as a function of the center thickness MD of an optical component and the gradient G of the optical component.

The correction module KORMB according to FIG. 14B is implemented by means of a neural network comprising two input nodes IL (input layer), four hidden nodes HL (hidden layer) and four output nodes OL (output layer). Input variables to the input nodes IL are the quotient of the gradient G of a bright-dark-boundary generated by the optical component and its base value BG as well as the quotient of the center thickness MD and a base value of the center thickness BMD.

To determine the parameters, the correction values are multiplied by their respective target values. Thus, a corrected target value for the hot runner temperature HKT results from the product of the correction value KHKT for the hot runner temperature HKT determined by the neural network as output variable and the corresponding target value. A corrected target value for the injection pressure ESD results from the product of the correction value KESD for the injection pressure ESD and the corresponding target value for the injection pressure ESD. A corrected target value for the holding pressure NDR results from the product of the correction value KNDR of the holding pressure NDR determined by the neural network as output variable and the corresponding target value of the holding pressure NDR. A corrected target value for the holding pressure duration KNDA results from the product of the correction value KNDA for the holding pressure duration NDA determined by the neural network as output variable and the target value of the holding pressure duration NDA.

Figure 14C:
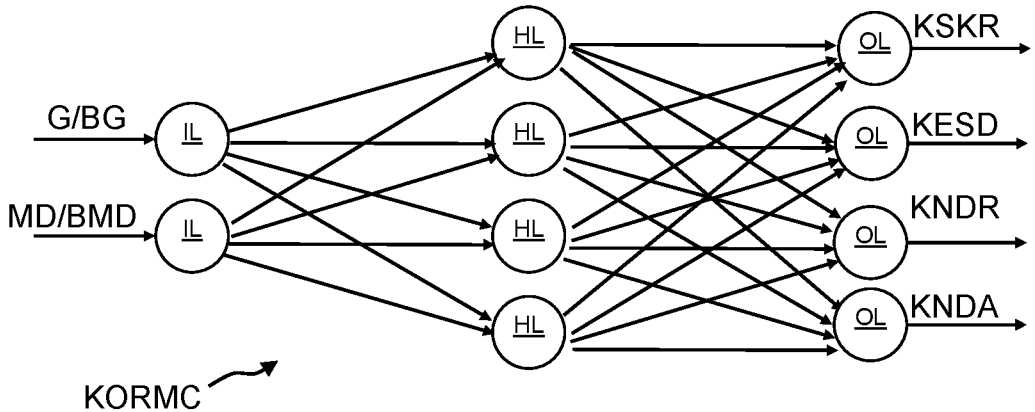
FIG. 14C shows an embodiment of another correction module.

FIG. 14C shows a correction module KORMC for determining a correction value KESD for the injection pressure ESD, a correction value KNDR for the holding pressure NDR, a correction value KNDA for the holding pressure duration NDA and a correction value KSKR for the closing force SKR as a function of the center thickness MD of an optical component and the gradient G of the optical component.

The correction module KORMC according to FIG. 14C is implemented by means of a neural network comprising two input nodes IL (input layer), four hidden nodes HL (hidden layer) and four output nodes OL (output layer). Input variables to the input nodes IL are the quotient of the gradient G of a bright-dark-boundary generated by the optical component and its base value BG as well as the quotient of the center thickness MD and a base value of the center thickness BMD.

To determine the parameters, the correction values are multiplied by their respective target values. Thus, a corrected target value for the injection pressure ESD results from the product of the correction value KESD for the injection pressure ESD determined by the neural network as output variable and the corresponding target value of the injection pressure ESD. A corrected target value for the holding pressure NDR is obtained from the product of the correction value KNDR of the holding pressure NDR determined by the neural network as output variable and the corresponding target value of the holding pressure NDR. A corrected target value for the holding pressure duration KNDA results from the product of the correction value KNDA for the holding pressure duration NDA determined by the neural network as output variable and the target value of the holding pressure duration NDA. A corrected target value for the closing force SKR results from the product of the correction value KSKR for the closing force SKR determined by the neural network as output variable and the corresponding target value of the closing force SKR.

Figure 14D:
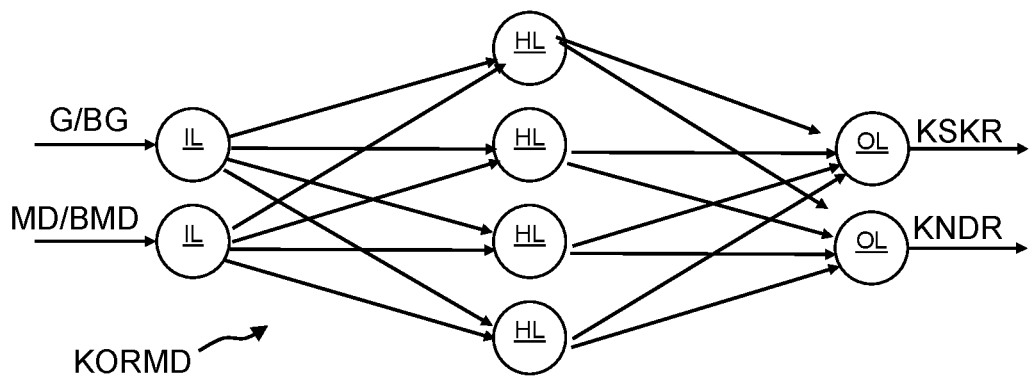
FIG. 14D shows an embodiment of another correction module.

FIG. 14D shows a correction module KORMD for determining a correction value KNDR for the holding pressure NDR, and a correction value for the closing force SKR as a function of the center thickness MD of an optical component and the gradient G of the optical component.

The correction module KORMD according to FIG. 14D is implemented by means of a neural network comprising two input nodes IL (input layer), four hidden nodes HL (hidden layer) and two output nodes OL (output layer). Input variables to the input nodes IL are the quotient of the gradient G of a bright-dark-boundary generated by the optical component and its base value BG as well as the quotient of the center thickness MD of the optical component and a base value of the center thickness BMD.

To determine the parameters, the correction values are multiplied by their respective target values. Thus, a corrected target value for the holding pressure NDR results from the product of the correction value KNDR of the holding pressure NDR determined by the neural network as output variable and the corresponding target value of the holding pressure NDR. A corrected target value for the closing force SKR results from the product of the correction value KSKR for the closing force SKR and the corresponding target value of the closing force SKR.

Figure 14E:
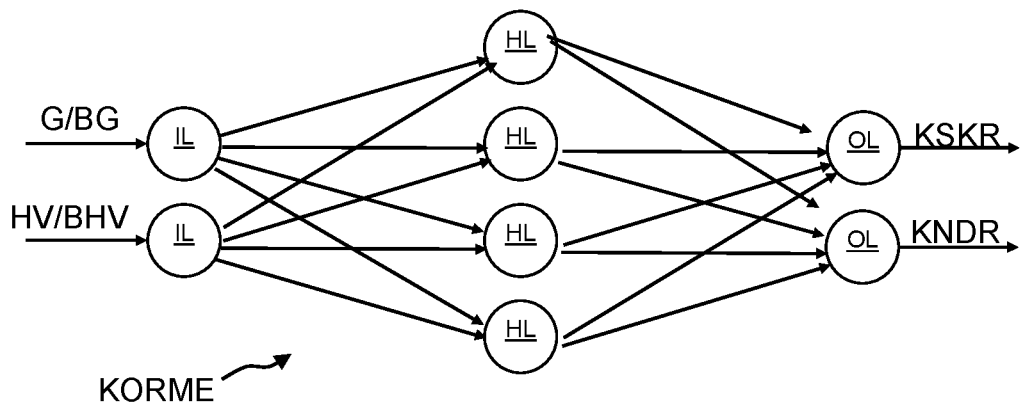
FIG. 14E shows an embodiment of another correction module.

FIG. 14E shows a correction module KORME for determining a correction value KNDR for the holding pressure NDR and a correction value KSKR for the closing force SKR as a function of the glare value HV of an optical component and the gradient G of the optical component.

The correction module KORME according to FIG. 14E is implemented by means of a neural network comprising two input nodes IL (input layer), four hidden nodes HL (hidden layer) and two output nodes OL (output layer). Input variables into the input nodes IL are the quotient of the gradient G of a bright-dark-boundary generated by the optical component and its base value BG as well as the quotient of the glare value HV and a base value of the glare value BHV of the optical component.

To determine the parameters, the correction values are multiplied by their respective target values. Thus, a corrected target value for the holding pressure NDR results from the product of the correction value KNDR of the holding pressure NDR and the corresponding target value of the holding pressure NDR. A corrected target value for the closing force SKR results from the product of the correction value KSKR for the closing force SKR determined by the neural network as output variable and the corresponding target value of the closing force SKR.

Figure 14F:
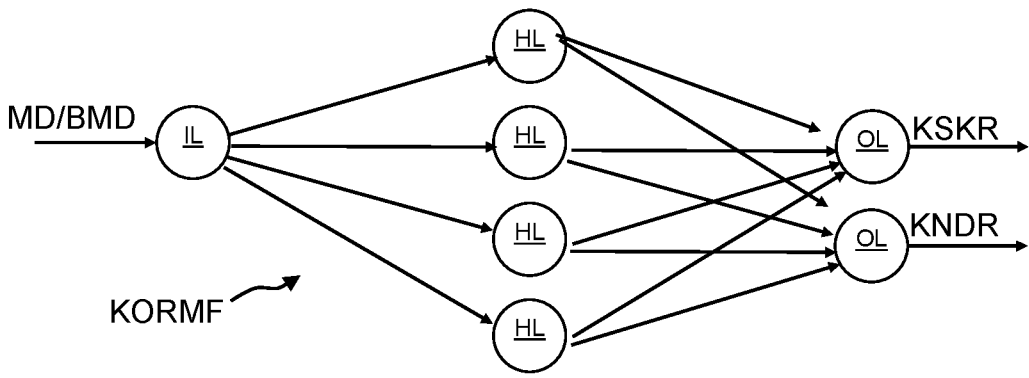
FIG. 14F shows an embodiment of another correction module.

FIG. 14F shows a correction module KORMF for determining a correction value KNDR for the holding pressure NDR and a correction value for the closing force SKR depending on the center thickness MD of an optical component.

The correction module KORMF according to FIG. 14F is implemented by means of a neural network comprising an input node IL (input layer), four hidden nodes HL (hidden layer) and two output nodes OI (output layer). The input variable in the input node IL is the quotient of the center thickness MD and a base value BMD of the center thickness MD of the optical component.

To determine the parameters, the correction values are multiplied by their respective target values. Thus, a corrected target value for the holding pressure NDR results from the product of the correction value KNDR of the holding pressure NDR determined by the neural network as output variable and the corresponding target value of the holding pressure NDR. A corrected target value for the closing force SKR results from the product of the correction value KSKR for the closing force SKR and the corresponding target value of the closing force SKR.

In the embodiments according to FIG. 14A, FIG. 14B, FIG. 14C and FIG. 14D, the determination of corrected parameters is performed as a function of photometric values and geometric values. In the embodiment example according to FIG. 14E, the determination of the parameters is performed solely as a function of the photometric parameters such as for example the gradient of the bright-dark-boundary generated by means of the optical component and the glare value (HV value) of the optical component. In the embodiment according to FIG. 14F, the parameters are determined solely as a function of geometrical parameters of an optical element.

It may be provided that the choice of the correction module is made depending on the available database for training a neural network. For example, it may be provided to start with the correction module KORMF according to FIG. 14F. As soon as the database is large enough, it may be provided to replace the correction module KORMF according to FIG. 14F by the correction module KORMD according to FIG. 14D. If the database continues to increase, the correction module KORMD according to FIG. 14D may be replaced by the correction module KORMB according to FIG. 14B.

FIG. 15 shows an alternative of the operation of the manufacturing island FIN in deviation of the operation of the manufacturing island FIN shown in FIG. 2. In variation, the tool P3 is not replaced by the tool P3' and vice versa, but the tool P2 is replaced by the tool P2' and for the manufacturing or injection molding of optical elements the tool P2' is replaced by the tool P2.

Figure 16:
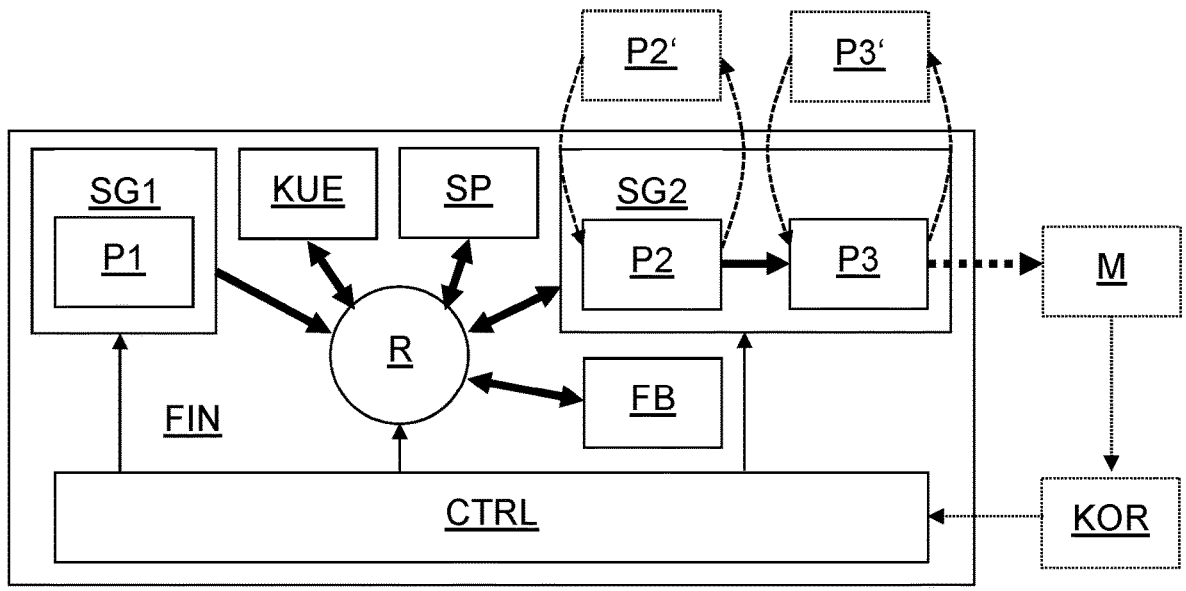
FIG. 16 shows the manufacturing island according to FIG. 2 or FIG. 15 in a further modified configuration.

FIG. 16 shows a further variation of the manufacturing island or its operation or use. Here, for the evaluation of the optical properties of an optical element in the optical test bench M, the tools P2 and P3 are replaced by the according or corresponding smooth tools P2' and P3'. If the parameters PAR are determined with sufficient accuracy (cf. query 120 in FIG. 1), then the smooth injection molding tools P2' and P3' are replaced by the corresponding actual tools P2 and P3, respectively.

Figure 17:
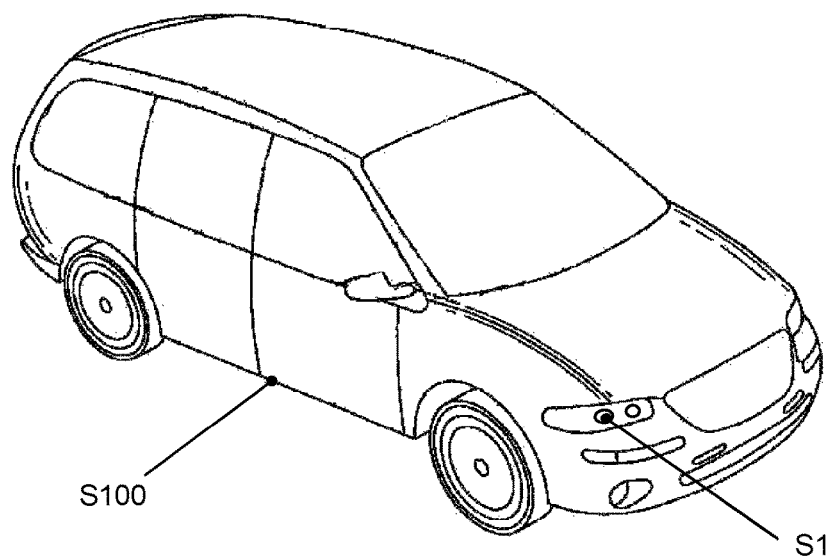
FIG. 17 shows an embodiment of a motor vehicle.
Figure 18:
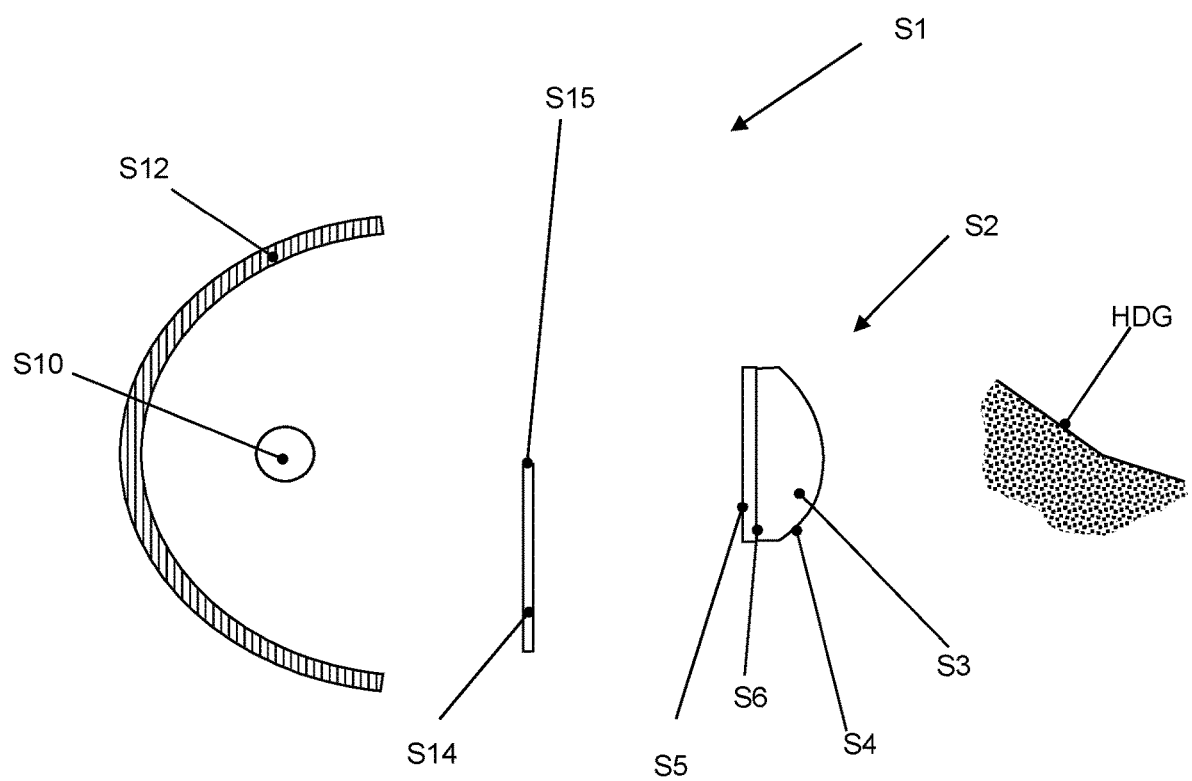
FIG. 18 shows a schematic representation of an exemplary vehicle headlight of the motor vehicle according to FIG. 17.

FIG. 17 shows a motor vehicle S100 with a vehicle headlight S1 shown schematically in FIG. 18 with a light source S10 for generating light, a reflector S12 for reflecting light that can be generated by means of the light source S10, and a shield S14. The vehicle headlight S1 further comprises—as an embodiment for an optical element produced according to a method according to FIG. 1, such as the optical elements 41 and 42 or OE with a light-scattering structure superimposed on the contour—a headlight lens S2 for changing the beam direction of light that can be generated by means of the light source S10 and, for example, for imaging an edge of the shield S14 designated by reference character S15 in FIG. 18 as a bright-dark-boundary HDG. The headlight lens S2 comprises a lens body S3 made of a transparent plastic, for example polymer, which comprises a surface S5 facing the light source S10 and a convex curved surface S4 facing away from the light source S10. The headlight lens S2 further comprises, for example, a rim S6 corresponding to the rim 431, by means of which the headlight lens S2 can be fixed in the vehicle headlight S1. Typical requirements for the bright-dark-boundary HDG or for the light distribution taking into account or including the bright-dark-boundary HDG are disclosed, for example, in Bosch—Automotive Handbook, 9th edition, ISBN 978-1-119-03294-6 (incorporated by reference in its entirety), page 1040.

Figure 19:
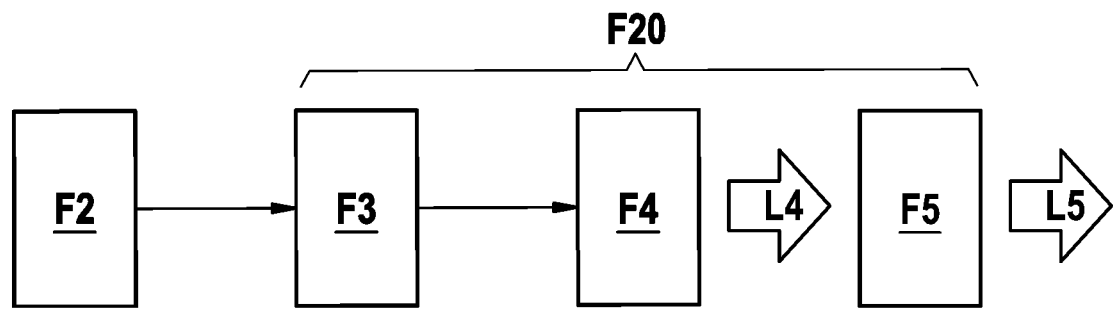
FIG. 19 shows an embodiment of a further vehicle headlight for use in the motor vehicle according to FIG. 17 in a principle representation.
Figure 20:
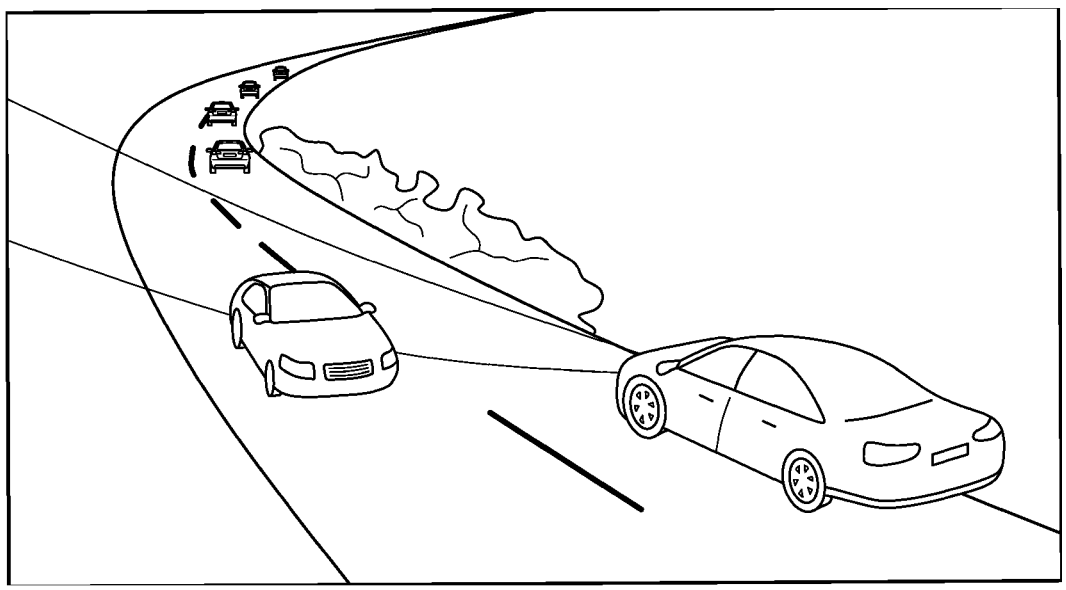
FIG. 20 shows an embodiment for matrix light or adaptive high beam.
Figure 21:
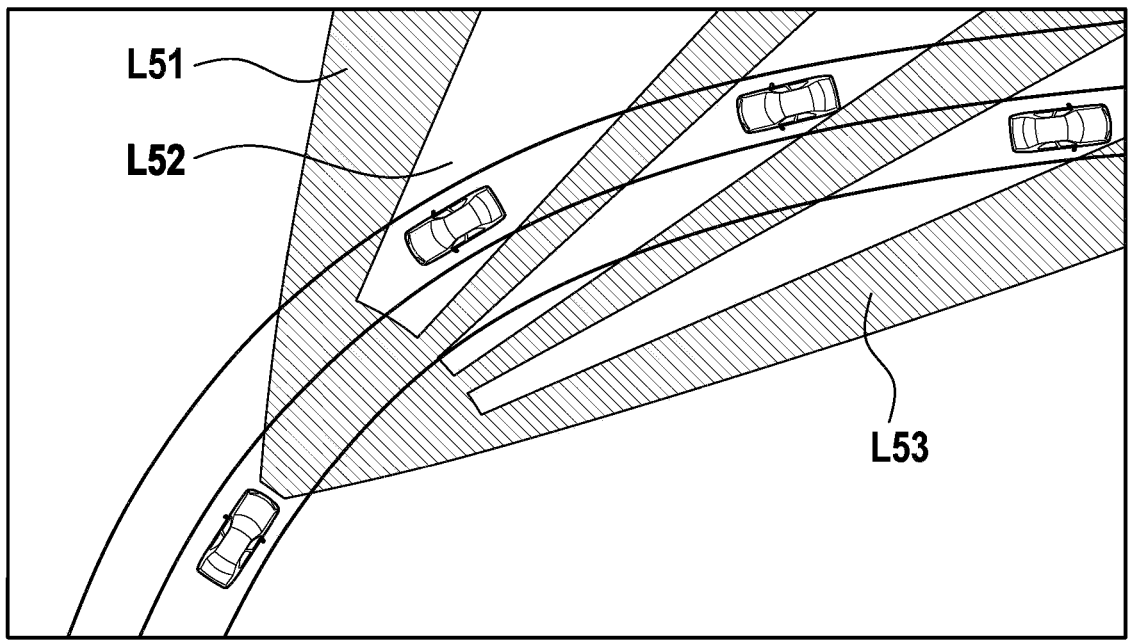
FIG. 21 shows another embodiment example for matrix light or adaptive high beam.

FIG. 19 shows an adaptive headlight or vehicle headlight F20—which can be used instead of the vehicle headlight S1—for situation- or traffic-dependent illumination of the surroundings or the road ahead of the motor vehicle S100 as a function of environment sensoric F2 of the motor vehicle S100. For this purpose, the vehicle headlight F20 shown schematically in FIG. 19 has an illumination device F4 which is actuated by means of a controller F3 of the vehicle headlight F20. Light L4 generated by the illumination device F4 is emitted as an illumination pattern L5 from the vehicle headlight F20 onto the area in front of the motor vehicle S100 by means of an objective F5, which may comprise on the light output side an optical element or a corresponding headlight lens produced in accordance with the aforementioned method. Examples of corresponding illumination patterns are shown in FIG. 20 and FIG. 21, as well as the websites web.archive.org/web/20150109234745/ http://www.audi.de/content/de/brand/de/vorsprung-_durch_technik/content/2013/08/Audi-A8-erstrahlt-in-neuem-Licht.html (accessed Sep. 5, 2019) and www.all-electronics.de/matrix-led-und-laserdicht-bietetviele-vorteile/ (accessed Sep. 2, 2019). In the embodiment shown in FIG. 21, the illumination pattern L5 includes dazzled areas L51, dimmed areas L52, and cornering lights L53.

Figure 22:
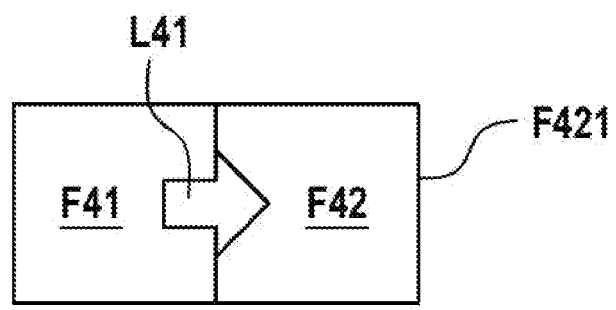
FIG. 22 shows an example of an illumination device of a vehicle headlight according to FIG. 19.

FIG. 22 shows an embodiment for the illumination device F4, wherein it comprises a light source arrangement F41 with a plurality of individually adjustable areas or pixels. For example, up to 100 pixels, up to 1000 pixels, or not less than 1000 pixels may be provided, which in the sense are individually controllable by means of the controller F3 such that they can be individually switched on or off, for example. It may be provided that the illumination device F4 further comprises an attachment optics F42 for generating an illumination pattern (such as L4) at the light exit surface F421 in accordance with the correspondingly controlled areas or pixels of the light source arrangement F41 or in accordance with the light L41 irradiated into the attachment optics F42.

Matrix headlights within the meaning of the present disclosure may also be matrix SSL HD headlights. Examples of such headlights are shown in the Internet link www.springerprofessional.de/fahrzeug-lichttechnik/ fahrzeugsicherheit/hella-bringt-neues-ssi-hd-matrixlichtsys-tem-auf-den-markt/17182758 (accessed May 28, 2020), the Internet link www.highlightweb.de/5874/hella-ssl-hd/ (accessed May 28, 2020), and the Internet link www.hella.com/ techworid/de/Lounge/Unser-Digital-Light-SSL-HD-Licht-system-ein-neuerMeilenstein-der-automobilen-Lichttechnik-55548/ (accessed May 28, 2020).

Figure 23:
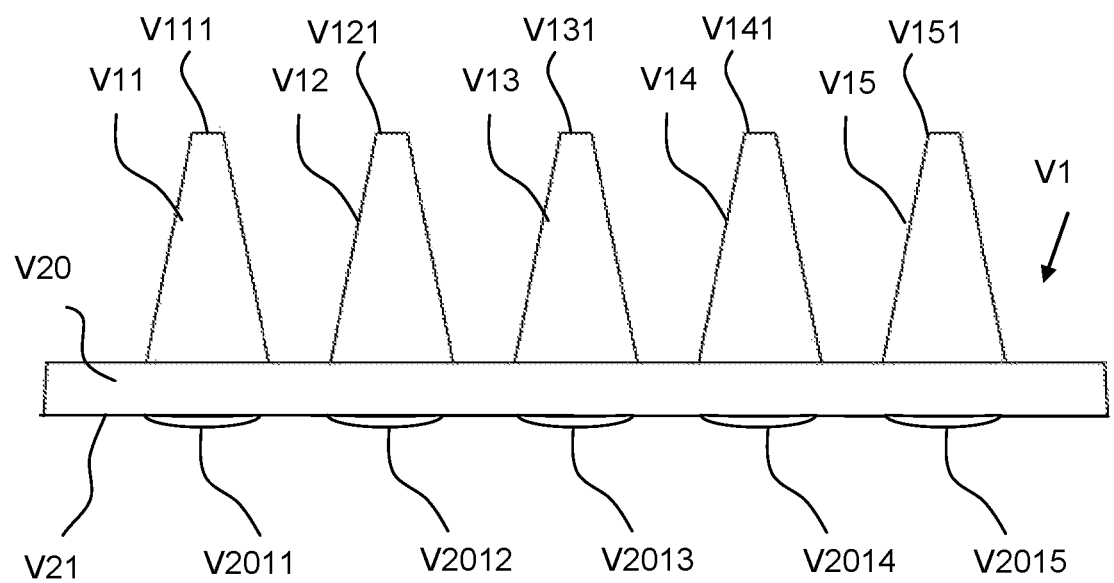
FIG. 23 shows an embodiment of an attachment optics array in a side view.
Figure 24:
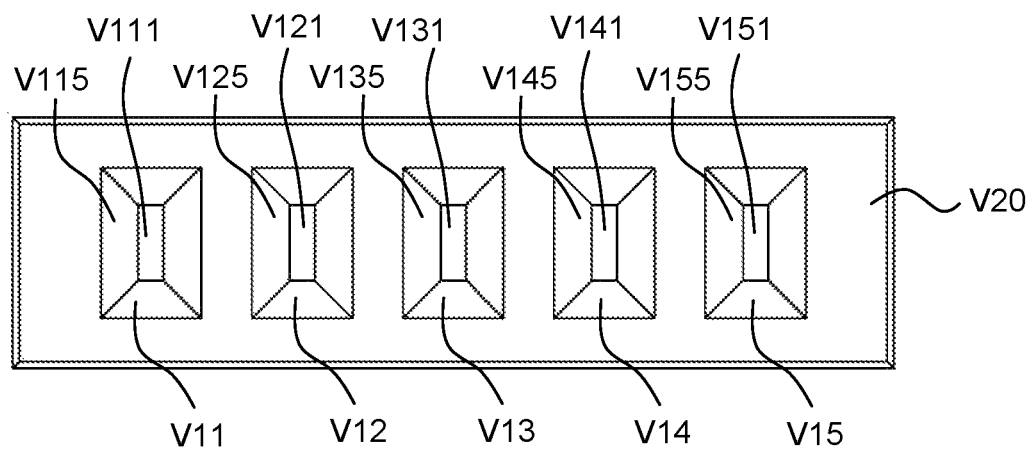
FIG. 24 shows the attachment optics array shown in FIG. 23 in a top view and, FIG. 25 shows the use of an attachment optics array according to FIG. 23 and FIG. 24 in a motor vehicle headlight usable in a motor vehicle according to FIG. 17.

FIG. 23 shows a one-piece attachment optics array V1 in a side view. FIG. 24 shows the attachment optics array V1 in a top view from behind. The attachment optics array V1 comprises a base member V20 on which lenses V2011, V2012, V2013, V2014, and V2015 and an attachment optics V11 having a light entering surface V111, an attachment optics V12 having a light entering surface V121, an attachment optics V13 having a light entrance surface V131, an attachment optics V14 having a light entrance surface V141, and an attachment optics V15 having a light entrance surface V151 are formed. The side areas V115, V125, V135, V145, V155 of the attachment optics V11, V12, V13, V14, V15 are configured in such a way that light entering the respective light entrance surface V111, V121, V131, V141 or V151 is subject to total internal reflection (TIR), so that this light emerges from the base part V20 or the surface V21 of the base part V20, which forms the common light exit surface of the attachment optics V11, V12, V13, V14 and V15. The rounding radii between the light entrance surfaces V111, V121, V131, V141 and V151 at the transition to the side areas V115, V125, V135, V145 and V 155 are, for example, 0.16 to 0.2 mm.

Figure 25:
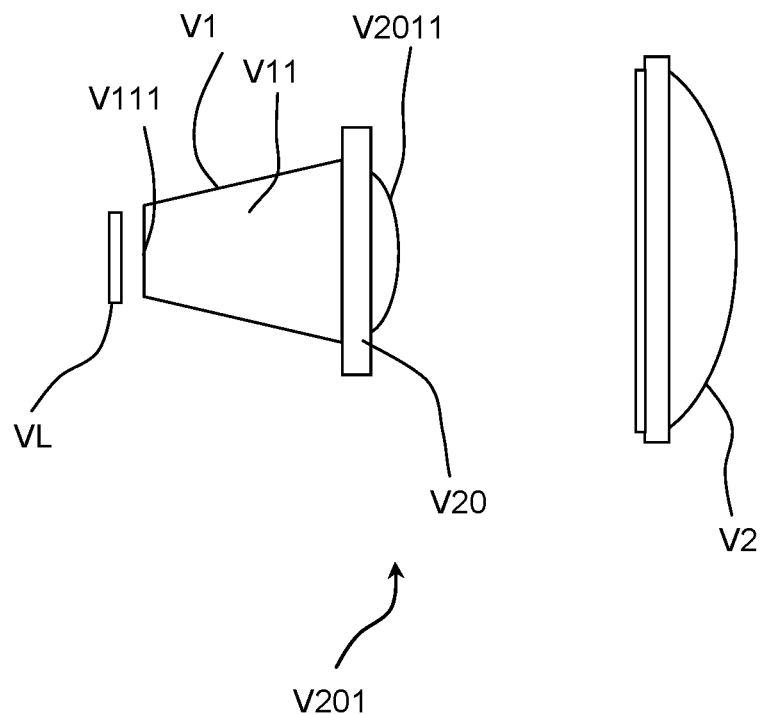

FIG. 25 shows a vehicle headlight V201 or motor vehicle headlight—which can be used instead of the vehicle headlight S1—in a principle representation. The vehicle headlight V201 comprises a light source arrangement VL, for example comprising LEDs, for irradiating light into the light entrance surface V111 of the attachment optics V11 or the light entrance surfaces V121, V131, V141 and V151, not shown in greater detail, of the attachment optics V12, V13, V14 and V15. In addition, the vehicle headlight V201 comprises a secondary lens V2 produced according to a method mentioned above for imaging the light exit surface of the attachment optics V11 or the surface V21 of the attachment optics array V1, which is not shown in more detail. The attachment optics array V1 is preferably made of glass, but may be made of plastic for certain applications. If the attachment optics array is made of plastic, it is for example provided that the lenses V2011, V2012, V2013, V2014 and V2015 or the light emitting surface of the attachment optics V11 has a light scattering structure superimposed on the contour. In this context, it may be provided that the attachment optics V11 are manufactured or injection molded according to a process as described with reference to FIG. 1.

Figure 26:
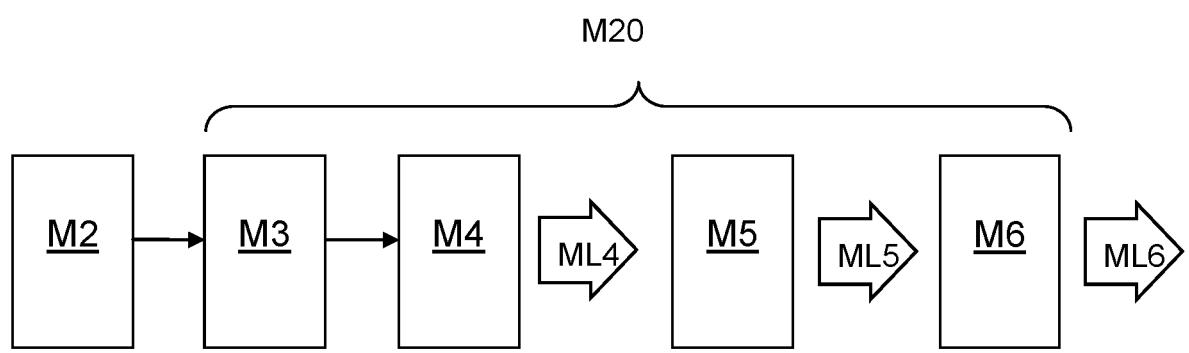
FIG. 26 shows another embodiment of an alternative motor vehicle headlight for use in the motor vehicle shown in FIG. 17.

Another suitable field of application for optical elements or lenses manufactured according to the disclosure is disclosed, for example, in DE 10 2017 105 888 A1 or the headlight described with reference to FIG. 26 for use instead of the vehicle headlight S1. Thereby, FIG. 26 exemplarily shows a light module (headlight) M20 comprising a light emitting unit M4 having a plurality of point-shaped light sources arranged in a matrix-like manner, each emitting light ML4 (having a Lambertian radiation characteristic), and further comprising a concave lens M5 and a projection optics M6. In the example shown in DE 10 2017 105 888 A1 according to FIG. 26, the projection optics M6 comprises two lenses arranged one behind the other in the beam path, it being provided for example that the lens on the light output side has been produced according to a process corresponding to the aforementioned process. The projection optics M6 projects the light ML4 emitted by the light emitting unit M4 and, after passing through the concave lens M5, further shaped light ML5 as a resulting light distribution ML6 of the light module M20 on the roadway in front of the motor vehicle S100 in which the light module M20 or the headlight is (have been) installed.

The light module M20 has a controller, designated by reference sign M3, which controls the light emitting unit M4 as a function of the values of a sensor system or environmental sensoric M2 of the motor vehicle S100. The concave lens M5 has a concavely curved exit surface on the side facing away from the light emitting unit M4. The exit surface of the concave lens M5 redirects light ML4 irradiated into the concave lens M5 by the light emitting unit M4 with a large irradiation angle toward the rim of the concave lens by means of total reflection, so that it does not pass through the projection optics M6. According to DE 10 2017

105 888 A1, light beams emitted at a 'large beam angle' by the light emitting unit M4 are those light beams which (without arrangement of the concave lens M5 in the beam path) would be poorly imaged, for example blurred, on the roadway by means of the projection optics M6 due to optical aberrations and/or which could lead to stray light which reduces the contrast of the image on the roadway (see also DE 10 2017 105 888 A1). It may be provided that the projection optics M6 can only sharply image light with an aperture angle limited to approximately +/−20°. Light beams with aperture angles greater than +/−20°, for example greater than +/−30°, are thus prevented from hitting the projection optics M6 by the arrangement of the concave lens M5 in the beam path.

The light emitting unit M4 can be designed differently. According to one embodiment, the individual point-shaped light sources of the light emitting unit M4 each comprise a semiconductor light source, for example a light emitting diode (LED). The LEDs can be selectively controlled individually or in groups to switch the semiconductor light sources on or off or to dim them. For example, the light module M20 has more than 1,000 individually controllable LEDs. For example, the light module M20 can be designed as a so-called µAFS (micro-structured adaptive front-lighting system) light module.

According to an alternative possibility, the light emitting unit M4 comprises a semiconductor light source and a DLP or micromirror array comprising a plurality of micromirrors that can be individually controlled and tilted, each of the micromirrors forming one of the point light sources of the light emitting unit M4. For example, the micromirror array comprises at least 1 million micromirrors that may be tilted, for example, at a frequency of up to 5,000 Hz.

Figure 27:
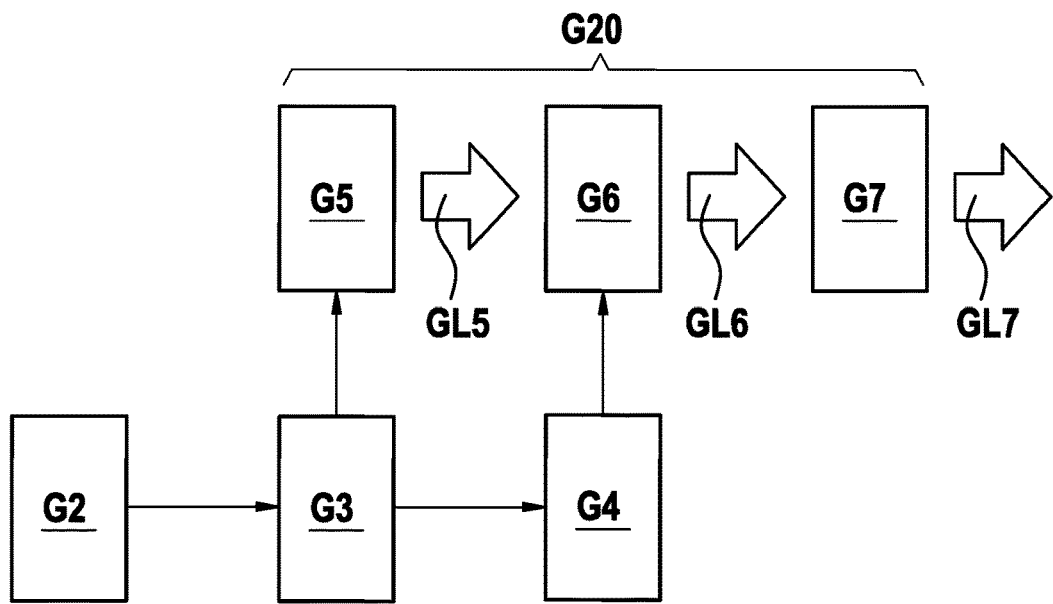
FIG. 27 shows another embodiment of an alternative motor vehicle headlight for use in the motor vehicle shown in FIG. 17.
Figure 28:
FIG. 28 shows an example of illumination by means of the motor vehicle headlight shown in FIG. 27.

Another example of a headlight system or light module (DLP system) is disclosed by the Internet link www.al-lighting.com/news/article/digital-light-millions-of-pixels-on-the-road/ (accessed Apr. 13, 2020). A schematically represented corresponding headlight module or vehicle headlight for generating an illumination pattern designated GL7A in FIG. 28 is shown in FIG. 27. The adaptive headlight G20 schematically shown in FIG. 27—which can be used instead of the vehicle headlight S1—is used for situation- or traffic-dependent illumination of the surroundings or the roadway in front of the motor vehicle S100 as a function of environmental sensoric G2 of the motor vehicle S100. Light GL5 generated by the illumination device G5 is formed into an illumination pattern GL6 by means of a system of micromirrors G6, as also shown, for example, in DE 10 2017 105 888 A1, which in turn radiates light GL7 suitable for adaptive illumination in front of the motor vehicle S100 or in an environment on the roadway in front of the motor vehicle S100 by means of projection optics G7 comprising, on the light output side, a lens (with a light-scattering structure superimposed on the contour) produced in accordance with the aforementioned method. A suitable system G6 of movable micromirrors is disclosed by Internet link Internet link www.al-lighting.com/news/article/digital-light-millions-of-pixels-on-the-road/ (accessed Apr. 13, 2020).

A controller G4 is provided for controlling the system G6 with movable micromirrors. In addition, the headlight G20 includes a controller G3 both for synchronization with the controller G4 and for controlling the lighting device G5 in response to environmental sensoric G2. Details of the controllers G3 and G4 can be obtained from the Internet link www.al-lighting.com/news/article/digital-light-millions-of-pixels-on-the-road/ (accessed Apr. 13, 2020). The illumination device G5 may comprise, for example, an LED arrangement or a comparable light source arrangement, an optical system such as a field lens (which, for example, has also been manufactured according to the described method), and a reflector.

Figure 29:
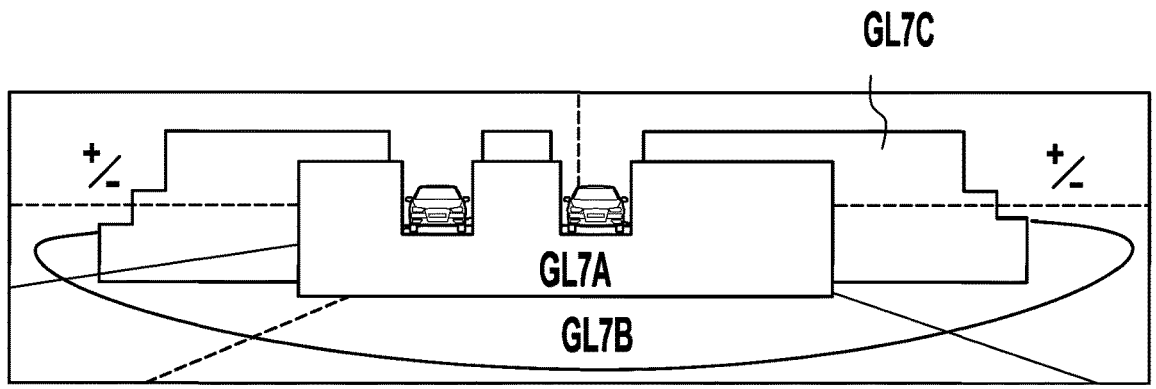
FIG. 29 shows an embodiment for superimposed illumination using the illumination according to FIG. 28 and the illumination of two further headlight systems or subsystems.

The vehicle headlight G20 described with reference to FIG. 27 may be used for example in conjunction with other headlight modules or headlights to achieve a superimposed overall light profile or illumination pattern. This is shown by way of example in FIG. 29, where the overall lighting pattern is composed of the lighting pattern GL7A, GL7C and GL7B. For example, it can be provided that the illumination pattern GL7B is generated by means of the headlight S1 and the illumination pattern GL7C is generated by means of the headlight V201.

The elements or objects in FIG. 1, FIG. 2, FIG. 3, FIG. 4, FIG. 6, FIG. 7, FIG. 9, FIG. 10, FIG. 14, FIG. 15, FIG. 16, FIG. 18, FIG. 19, FIG. 20, FIG. 21, FIG. 22, FIG. 23, FIG. 24, FIG. 25, FIG. 26, FIG. 27, FIG. 28 and FIG. 29, are drawn with simplicity and clarity in mind and not necessarily to scale. For example, the scales of some elements are exaggerated relative to other elements to enhance understanding of embodiments of the present disclosure.

The disclosure specifies an (improved) production process for optical elements with a surface structure. In this context, a particularly high contour fidelity and/or surface quality for optical elements or lenses or headlight lenses is achieved. In addition, the costs of a production process for optical elements such as headlights or vehicle headlights is reduced.

LIST OF REFERENCE SIGNS 2, 3 pre-injection molded part
4 injection molded part
20, 30, 40 sprue
21, 22, 31, 32 pre-injection molded component
30, 40 additional sprue
25, 35, 45 plastic as injection molding material/injection pressing material for overmolding a pre-injection molded component or for injecting on a pre-injection molded component
41, 42 optical element (automotive lens element)
50, 50' injection molding unit
51 heating system
52 screw
53 material feeder
54 liquefied plastic
60, 60' injection molding tool
61, 62, 61', 62' partial mold
71 ejector
72 cooling channels
80, 80', 80" hot runner system
81 hot runner nozzle
111 injection molding step
112 cooling step
113 injection molding step
114 injection molding step
115 query
116 tool change step
117 injection molding step
118 test step
119 correction step
120 query
121 tool change step
500, 500' Injection molding machine P1, P2, P2', P3, P3' mold or cavity (or tool or injection molding tool)
KUE cooling system
SP reservoir
R handling robot
SG1, SG2 injection molding machine
FB conveyor belt
FIN manufacturing island
CTRL controller
M optics test bench
KOR correction
OE, OE' optical element (automotive lens element)
OE* optical target element
PAR parameters
KUN plastic
SGA, SGA'
ADAP
S100 motor vehicle
S1 vehicle headlight
S2 headlight lens
S3 lens body
S4 convex curved surface
S5 a surface facing a light source
S6 rim
S10 light source
S12 reflector
S14 shield
S15 edge of a shield
HDG light-dark boundary
F2 environment sensoric
F3 controller
F4 illumination device
F5 lens
F20, V201 vehicle headlight
F41 light source arrangement
F42 attachment optics
F421 light exit surface of F4
L4 light
L41 light irradiated in F42
L5 lighting pattern
L51 dazzled areas
L52 dimmed areas
L53 curve light
V1 attachment optics array
V2 attachment optics, secondary lens
V11, V12, V13, V14, V15 attachment optics
V20 base part
V21 surface from V20
V111, V121, V131,
V141, V151 light entrance surface
V115, V125, V135,
V145, V155 side areas
V2011, V2012, V2013,
V2014, V2015 lenses
VL light source arrangement
M2 environment sensoric
M3 controller
M4 light emitting unit
ML4 light
M5 concave lens
ML5 further light
M6 projection optics
ML6 resulting light distribution
M20 light module
G20 headlight
G2 environmental sensoric
G3 control system
G4 control system
G5 lighting device
GL5 light generated by GL5
G6 system of micromirrors
GL6 illumination pattern
G7 projection optics
GL7 light
GL7A, GL7B, GL7C illumination pattern
$P_{max}$, $P_{min}$ light power

The invention claimed is:

1. A method for producing an optical element with at least one optically effective surface, wherein the optically effective surface comprises a contour and a surface structure superimposed on the contour, the method at least comprising:
   providing a first injection mold;
   providing a second injection mold configured for forming an optically effective surface comprising the contour and the surface structure superimposed on the contour;
   providing a smooth injection mold configured for forming the contour but not the surface structure superimposed on the contour;
   injecting liquid transparent plastic into the first injection mold to form a first pre-injection molded component depending on a first group of injection molding parameters;
   afterwards cooling the first pre-injection molded component;
   afterwards injection molding a layer of plastic forming an optically effective surface directly or indirectly onto the first pre-injection molded component using the second injection mold and applying a second group of injection molding parameters;
   afterwards substituting the second injection mold by the smooth injection mold;
   injecting liquid transparent plastic into the first injection mold to form a second pre-injection molded component depending on the first group of injection molding parameters;
   afterwards cooling the second pre-injection molded component;
   afterwards injection molding a layer of plastic forming a test-element having an optically effective surface directly or indirectly onto the second pre-injection molded component using the smooth injection mold and applying the second group of injection molding parameters;
   determining optical properties of the test-element;
   depending on the optical properties of the test-element adjusting at least one parameter from the second group of injection molding parameters;
   substituting the smooth injection mold by the second injection mold;
   afterwards injecting liquid transparent plastic into the first injection mold to form a third pre-injection molded component depending on the first group of injection molding parameters;
   afterwards cooling the third pre-injection molded component; and
   afterwards injection molding a layer of plastic forming an optically effective surface directly or indirectly onto the third pre-injection molded component using the second injection mold and applying the second group of injection molding parameters with the at least one adjusted parameter.

2. The method according to claim 1, wherein each of the first, second, and third pre-injection molded components is cooled outside the first injection mold.

3. The method according to claim 1, wherein at least one parameter of the first group of injection molding parameters is adjusted.

4. The method according to claim 3, wherein at least two parameters of the second group of injection molding parameters are adjusted.

5. The method according to claim 4, wherein an injection molding machine comprises the second injection mold, the injection molding machine having a hot runner, wherein the second group of injection molding parameters comprises a hot runner temperature.

6. The method according to claim 1, wherein at least three parameters of the second group of injection molding parameters are adjusted.

7. The method according to claim 6, wherein at least one parameter of the first group of injection molding parameters is adjusted.

8. The method according to claim 1, wherein an injection molding machine comprises the second injection mold, the injection molding machine having a hot runner, wherein the second group of injection molding parameters comprises a hot runner temperature.

9. The method according to claim 1, wherein the second group of injection molding parameters comprises an injection pressure and a holding pressure.

10. The method according to claim 1, wherein the second group of injection molding parameters comprises a holding pressure.

11. The method according to claim 1, wherein the second group of injection molding parameters comprises an injection pressure.

12. A method for producing an optical element with at least one optically effective surface, wherein the optically effective surface comprises a contour and a surface structure superimposed on the contour, the method comprising:
providing an injection molding machine comprising an injection mold configured for forming an optically effective surface comprising the contour and the surface structure superimposed on the contour;
providing a smooth injection mold configured for forming the contour but not the surface structure superimposed on the contour;
injection molding an optical element having an optically effective surface using the injection mold and applying a group of injection molding parameters;
afterwards substituting the injection mold by the smooth injection mold;
afterwards injection molding a layer of plastic forming a test-element having the contour but not the surface structure superimposed on the contour using the smooth injection mold and applying the group of injection molding parameters;
determining properties of the test-element including optical properties of the test-element;
adjusting at least one parameter from the group of injection molding parameters depending on the optical properties of the test-element;
afterwards substituting the smooth injection mold by the injection mold; and
afterwards injection molding an optical element having an optically effective surface using the injection mold and applying the adjusted group of injection molding parameters.

13. The method according to claim 12, wherein the group of injection molding parameters comprises an injection pressure, a holding pressure, and a holding pressure duration.

14. The method according to claim 13, the injection molding machine having a hot runner, wherein the group of injection molding parameters comprises a hot runner temperature.

15. The method according to claim 12, the injection molding machine having a hot runner, wherein the group of injection molding parameters comprises a hot runner temperature.

16. The method according to claim 12, wherein the group of injection molding parameters comprises an injection pressure and a holding pressure.

17. The method according to claim 12, wherein the group of injection molding parameters comprises a holding pressure.

18. The method according to claim 12, wherein the group of injection molding parameters comprises injection pressure.

19. The method according to claim 18, the injection molding machine having a hot runner, wherein the group of injection molding parameters comprises a hot runner temperature.

* * * * *